(12) United States Patent
Malwankar et al.

(10) Patent No.: US 10,348,830 B1
(45) Date of Patent: *Jul. 9, 2019

(54) VIRTUAL NON-VOLATILE MEMORY EXPRESS DRIVE

(71) Applicant: Pavilion Data Systems, Inc., San Jose, CA (US)

(72) Inventors: Kiron Balkrishna Malwankar, Saratoga, CA (US); Raghuraman Govindasamy, San Jose, CA (US); Dan M. Melnic, Los Gatos, CA (US)

(73) Assignee: Pavilion Data Systems, Inc., Sunnyvale, CA (US)

(*) Notice: Subject to any disclaimer, the term of this patent is extended or adjusted under 35 U.S.C. 154(b) by 17 days.

This patent is subject to a terminal disclaimer.

(21) Appl. No.: 15/652,106

(22) Filed: Jul. 17, 2017

Related U.S. Application Data

(63) Continuation of application No. 14/532,777, filed on Nov. 4, 2014, now Pat. No. 9,712,619.

(51) Int. Cl.
*H04L 29/08* (2006.01)
*G06F 9/455* (2018.01)

(52) U.S. Cl.
CPC ...... *H04L 67/1097* (2013.01); *G06F 9/45558* (2013.01); *H04L 67/2842* (2013.01); *G06F 2009/45579* (2013.01); *G06F 2009/45583* (2013.01)

(58) Field of Classification Search
CPC . G06F 2009/45583; G06F 2009/45595; G06F 9/45558; G06F 2009/45579; H04L 67/1097; H04L 67/2842
See application file for complete search history.

(56) References Cited

U.S. PATENT DOCUMENTS

| | | | |
|---|---|---|---|
| 6,055,603 | A | 4/2000 | Ofer et al. |
| 6,304,942 | B1 | 10/2001 | DeKoning |
| 6,345,368 | B1 | 2/2002 | Bergsten |
| 6,397,267 | B1 | 5/2002 | Chong, Jr. |
| 6,421,715 | B1 | 7/2002 | Chatterjee et al. |

(Continued)

FOREIGN PATENT DOCUMENTS

| | | |
|---|---|---|
| EP | 2309394 A2 | 4/2011 |
| WO | WO20080070174 A2 | 6/2008 |

(Continued)

OTHER PUBLICATIONS

"Using a storage area network with virtual machines," Microsoft, 2 pages, downloaded from http://technet.microsoft.com/en-us/library/cc7078298%28v=ws.10%29.aspx on Jul. 4, 2013.

*Primary Examiner* — Michael C Lai
(74) *Attorney, Agent, or Firm* — Lowenstein Sandler LLP

(57) ABSTRACT

A processing device receives an input/output (I/O) command generated by a process, the I/O command directed to a virtual storage provided to a host executing the process, wherein the virtual storage comprises a virtual non-volatile memory express (NVMe) drive. The processing device generates a new I/O command based on the received I/O command and encapsulates the new I/O command into a message. The processing device sends the message to at least one of a remote NVMe storage device or a storage server comprising one or more remote NVMe storage devices.

18 Claims, 14 Drawing Sheets

(56) References Cited

U.S. PATENT DOCUMENTS

| | | | |
|---|---|---|---|
| 6,425,051 B1 | 7/2002 | Burton et al. | |
| 6,564,295 B2 | 5/2003 | Okabayashi et al. | |
| 6,571,350 B1 | 5/2003 | Kurokawa et al. | |
| 6,640,278 B1 | 10/2003 | Nolan et al. | |
| 6,647,514 B1 | 11/2003 | Umberger et al. | |
| 6,732,104 B1 | 5/2004 | Weber | |
| 6,732,117 B1 | 5/2004 | Chilton | |
| 6,802,064 B1 | 10/2004 | Yao et al. | |
| 6,915,379 B2 | 7/2005 | Honda et al. | |
| 6,965,939 B2 | 11/2005 | Cuomo et al. | |
| 6,988,125 B2 | 1/2006 | Elnozahy et al. | |
| 7,031,928 B1 | 4/2006 | Cochran | |
| 7,035,971 B1 | 4/2006 | Merchant | |
| 7,035,994 B2 | 4/2006 | Tanaka et al. | |
| 7,437,487 B2 | 10/2008 | Chikamichi | |
| 7,484,056 B2 | 1/2009 | Madnani et al. | |
| 7,590,522 B2 | 9/2009 | Hansen et al. | |
| 7,653,832 B2 | 1/2010 | Faibish et al. | |
| 7,743,191 B1 | 6/2010 | Liao | |
| 7,769,928 B1 | 8/2010 | Tran et al. | |
| 7,836,226 B2 | 11/2010 | Flynn et al. | |
| 7,870,317 B2 | 1/2011 | Suresh | |
| 7,958,302 B2 | 6/2011 | Cherian et al. | |
| 8,019,940 B2 | 9/2011 | Flynn et al. | |
| 8,271,723 B1 | 9/2012 | Nasiby et al. | |
| 8,588,228 B1 | 11/2013 | Onufryk et al. | |
| 9,134,917 B2 | 9/2015 | Kimmel et al. | |
| 9,189,385 B2 | 11/2015 | Cohen et al. | |
| 9,223,597 B2 | 12/2015 | Deshpande et al. | |
| 9,280,508 B1 | 3/2016 | Tabor et al. | |
| 9,294,567 B2 * | 3/2016 | Hussain | G06F 3/065 |
| 9,298,648 B1 | 3/2016 | Johnson et al. | |
| 9,304,685 B2 | 4/2016 | Hashimoto et al. | |
| 9,311,230 B2 | 4/2016 | Fitch et al. | |
| 9,329,948 B2 | 5/2016 | Li et al. | |
| 9,336,134 B2 | 5/2016 | Danilak et al. | |
| 9,384,093 B1 * | 7/2016 | Aiello | G06F 11/1088 |
| 9,396,065 B2 | 7/2016 | Webb et al. | |
| 9,430,155 B2 | 8/2016 | Amir et al. | |
| 9,542,118 B1 | 1/2017 | Lercari et al. | |
| 9,565,269 B2 | 2/2017 | Malwankar et al. | |
| 9,633,041 B2 | 4/2017 | Xu et al. | |
| 9,712,619 B2 | 7/2017 | Malwankar et al. | |
| 9,727,503 B2 | 8/2017 | Kagan et al. | |
| 9,736,012 B2 | 8/2017 | Cherian et al. | |
| 9,798,485 B2 | 10/2017 | Kalman et al. | |
| 9,800,661 B2 | 10/2017 | Ori | |
| 9,804,993 B1 | 10/2017 | Brooker et al. | |
| 9,806,896 B2 | 10/2017 | Xiang et al. | |
| 9,823,866 B1 | 11/2017 | Radovanovic | |
| 9,824,027 B2 | 11/2017 | Flynn et al. | |
| 9,836,217 B2 | 12/2017 | Stabrawa et al. | |
| 9,880,971 B2 | 1/2018 | Lowery et al. | |
| 9,882,969 B2 | 1/2018 | Reddy et al. | |
| 9,893,996 B2 | 2/2018 | Dong | |
| 9,898,427 B2 | 2/2018 | Bergsten et al. | |
| 9,921,771 B2 | 3/2018 | Stabrawa et al. | |
| 2001/0013059 A1 | 8/2001 | Dawson et al. | |
| 2002/0035670 A1 | 3/2002 | Okabayashi et al. | |
| 2002/0087751 A1 | 7/2002 | Chong, Jr. | |
| 2002/0144001 A1 | 10/2002 | Collins et al. | |
| 2002/0147886 A1 | 10/2002 | Yanai et al. | |
| 2003/0074492 A1 | 4/2003 | Cochran | |
| 2003/0126327 A1 | 7/2003 | Pesola et al. | |
| 2003/0182504 A1 | 9/2003 | Nielsen et al. | |
| 2004/0010655 A1 | 1/2004 | Tanaka et al. | |
| 2004/0047354 A1 | 3/2004 | Slater et al. | |
| 2005/0039090 A1 | 2/2005 | Jadon et al. | |
| 2005/0125426 A1 | 6/2005 | Minematsu | |
| 2005/0154937 A1 | 7/2005 | Achiwa | |
| 2005/0193021 A1 | 9/2005 | Peleg | |
| 2006/0156060 A1 | 7/2006 | Forrer, Jr. et al. | |
| 2006/0265561 A1 | 11/2006 | Boyd et al. | |
| 2007/0038656 A1 | 2/2007 | Black | |
| 2007/0083641 A1 | 4/2007 | Hu et al. | |
| 2007/0168703 A1 | 7/2007 | Elliott et al. | |
| 2007/0233700 A1 | 10/2007 | Tomonaga | |
| 2008/0010647 A1 | 1/2008 | Chapel et al. | |
| 2008/0071999 A1 | 3/2008 | Boyd et al. | |
| 2008/0118065 A1 | 5/2008 | Blaisdell et al. | |
| 2008/0140724 A1 | 6/2008 | Flynn et al. | |
| 2008/0216078 A1 | 9/2008 | Miura et al. | |
| 2009/0019054 A1 | 1/2009 | Mace et al. | |
| 2009/0119452 A1 | 5/2009 | Bianchi | |
| 2009/0150605 A1 | 6/2009 | Flynn et al. | |
| 2009/0177860 A1 | 7/2009 | Zhu et al. | |
| 2009/0248804 A1 | 10/2009 | Ohtani | |
| 2009/0320033 A1 | 12/2009 | Gokhale et al. | |
| 2010/0100660 A1 | 4/2010 | Tamagawa | |
| 2010/0122021 A1 | 5/2010 | Lee et al. | |
| 2010/0122115 A1 | 5/2010 | Olster | |
| 2010/0223427 A1 | 9/2010 | Chan et al. | |
| 2010/0241726 A1 | 9/2010 | Wu | |
| 2010/0262760 A1 | 10/2010 | Swing et al. | |
| 2010/0262772 A1 | 10/2010 | Mazina | |
| 2011/0022801 A1 | 1/2011 | Flynn | |
| 2011/0035548 A1 | 2/2011 | Kimmel et al. | |
| 2011/0055458 A1 | 3/2011 | Kuehne | |
| 2011/0060882 A1 | 3/2011 | Efstathopoulos | |
| 2011/0060887 A1 | 3/2011 | Thatcher et al. | |
| 2011/0060927 A1 | 3/2011 | Fillingim et al. | |
| 2011/0078496 A1 | 3/2011 | Jeddeloh | |
| 2011/0087833 A1 | 4/2011 | Jones | |
| 2011/0179225 A1 | 7/2011 | Flynn et al. | |
| 2011/0219141 A1 | 9/2011 | Coile et al. | |
| 2011/0219208 A1 | 9/2011 | Asaad et al. | |
| 2011/0289261 A1 | 11/2011 | Candelaria | |
| 2011/0289267 A1 | 11/2011 | Flynn et al. | |
| 2011/0296133 A1 | 12/2011 | Flynn et al. | |
| 2011/0296277 A1 | 12/2011 | Flynn et al. | |
| 2012/0011340 A1 | 1/2012 | Flynn et al. | |
| 2014/0195634 A1 * | 7/2014 | Kishore | H04L 67/1097 709/213 |
| 2015/0006663 A1 * | 1/2015 | Huang | G06F 13/4221 709/213 |
| 2015/0032928 A1 | 1/2015 | Andrews et al. | |
| 2015/0161038 A1 | 6/2015 | Lee | |
| 2015/0261434 A1 | 9/2015 | Kagan et al. | |
| 2015/0304423 A1 | 10/2015 | Satoyama et al. | |
| 2015/0347349 A1 | 12/2015 | Raindel et al. | |
| 2015/0355946 A1 | 12/2015 | Kang | |
| 2015/0372962 A1 | 12/2015 | Padmanabhan | |
| 2015/0373115 A1 | 12/2015 | Breakstone et al. | |
| 2016/0036913 A1 | 2/2016 | Romem et al. | |
| 2016/0062652 A1 | 3/2016 | Hia et al. | |
| 2016/0077976 A1 | 3/2016 | Raikin et al. | |
| 2016/0118121 A1 | 4/2016 | Kelly et al. | |
| 2016/0127468 A1 | 5/2016 | Malwankar et al. | |
| 2016/0127492 A1 * | 5/2016 | Malwankar | H04L 67/2842 709/212 |
| 2016/0154591 A1 | 6/2016 | Breakstone et al. | |
| 2016/0357698 A1 * | 12/2016 | Huang | G06F 13/4068 |
| 2017/0102986 A1 | 4/2017 | Johnston et al. | |
| 2017/0132172 A1 | 5/2017 | Romem et al. | |
| 2017/0133107 A1 | 5/2017 | Ryan et al. | |
| 2017/0177222 A1 | 6/2017 | Singh et al. | |
| 2017/0213597 A1 | 7/2017 | Micheloni | |
| 2017/0262214 A1 | 9/2017 | Venkatesh et al. | |
| 2017/0286518 A1 | 10/2017 | Horowitz et al. | |
| 2017/0302595 A1 | 10/2017 | Tripathi et al. | |
| 2017/0317947 A9 | 11/2017 | Karamanolis et al. | |
| 2018/0011732 A1 | 1/2018 | Aron et al. | |
| 2018/0088820 A1 | 3/2018 | Davis et al. | |
| 2018/0101321 A1 | 4/2018 | Colgrove et al. | |
| 2018/0101425 A1 | 4/2018 | McChord et al. | |

FOREIGN PATENT DOCUMENTS

| | | |
|---|---|---|
| WO | WO20100117929 A1 | 10/2010 |
| WO | WO20110019596 A2 | 2/2011 |
| WO | WO20110031903 A2 | 3/2011 |
| WO | WO20110106394 A2 | 9/2011 |

* cited by examiner

VIRTUAL NON-VOLATILE MEMORY EXPRESS DRIVE

RELATED APPLICATIONS

This patent application is a continuation of U.S. patent application Ser. No. 14/532,777, filed Nov. 4, 2014, now U.S. Pat. No. 9,712,619, which is herein incorporated by reference.

FIELD OF TECHNOLOGY

This disclosure relates generally to the field of date storage and in particular to remotely connecting non-volatile memory express (NVMe) storage devices to computing devices.

BACKGROUND

Networked storage arrays may provide an enterprise level solution for secure and reliable data storage. With the introduction of solid state storage devices (e.g., solid state drives (SSDs) such as Flash drives), the speed of such networked storage arrays has improved dramatically. One promising technology for connecting to solid state storage devices is non-volatile memory express (NVMe). However, NVMe drives (e.g., PCI express (PCIe)-based solid state storage devices that use the NVMe protocol) conventionally are connected directly to a host that will be accessing those solid state storage devices.

BRIEF DESCRIPTION OF THE DRAWINGS

The embodiments described herein will be understood more fully from the detailed description given below and from the accompanying drawings.

DETAILED DESCRIPTION

Figure 1:
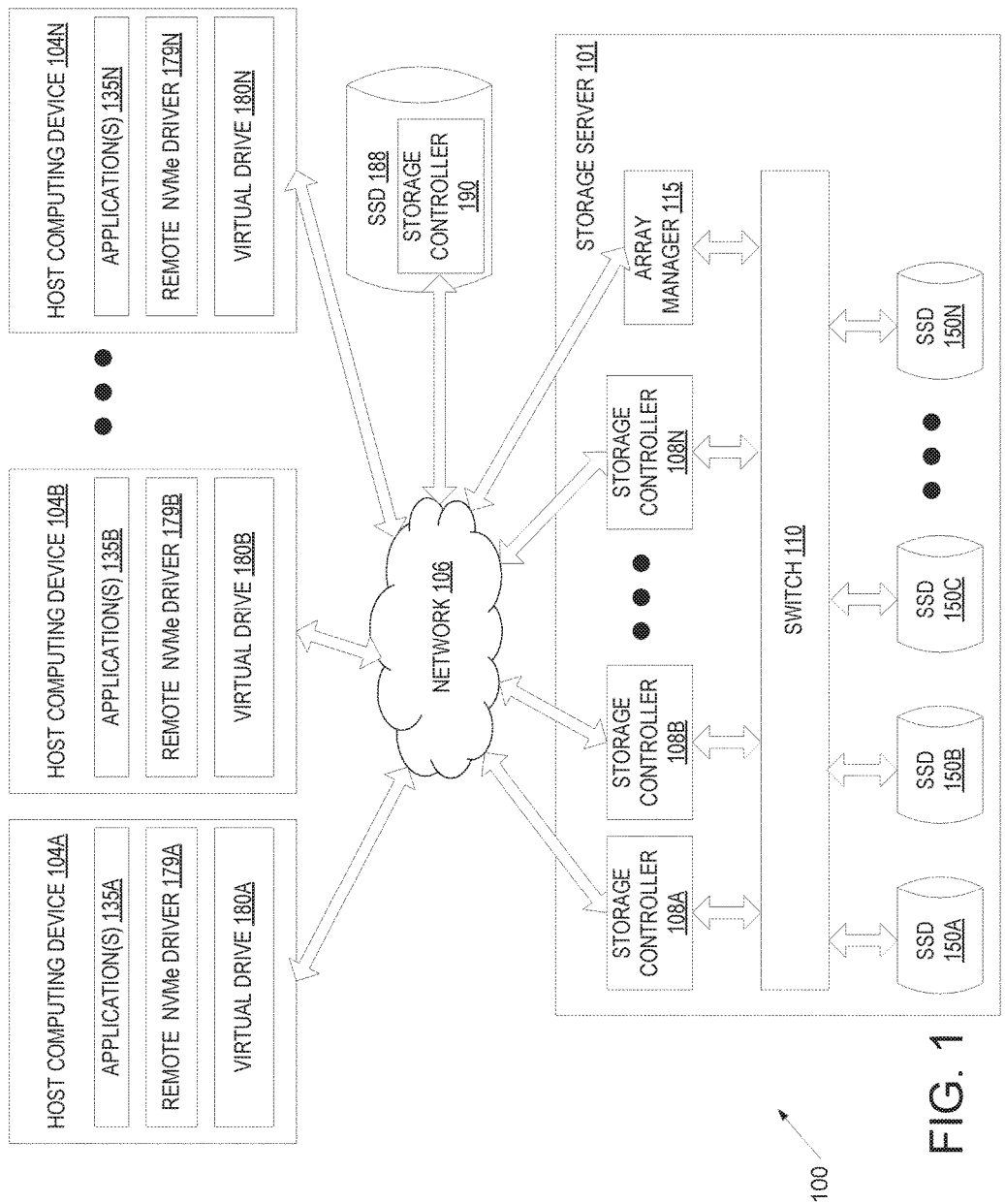
FIG. 1 is a block diagram example of a network architecture, in which embodiments described herein may operate.

Described herein is a transparent protocol for providing remote access to non-volatile memory express (NVMe) drives and other solid state drives (SSDs). Also described are systems and methods that enable and implement the transparent protocol. The described transparent protocol and the systems and methods that implement the protocol enable a decoupling of NVMe drives from hosts without an operating system, applications or drivers on the host being aware of the decoupling. In described embodiments, a remote NVMe driver on a host presents a virtual NVMe drive to the host. The remote NVMe driver may receive I/O commands and then generate new I/O commands directed to the virtual NVMe drive and encapsulate them into messages such as Ethernet packets. Alternatively, the remote NVMe driver may receive NVMe I/O commands and then encapsulate the received I/O commands into messages such as Ethernet packets. The messages may then be sent to a storage server that includes an array of physical NVMe drives. Alternatively, the messages may be sent to an NVMe drive that has a network frontend.

A storage controller in the storage server may include a mapping between the virtual NVMe drive and the array of physical NVMe drives. Alternatively, a storage controller in the storage device may include a one-to-one mapping between the virtual drive and the storage device. The storage controller may extract the received I/O commands and use the mapping to generate NVMe I/O commands for one or more of the physical NVMe drives based on the received I/O commands. Alternatively, the storage controller may extract NVMe commands from the received messages and forward those NVMe commands on to the appropriate physical NVMe drive.

The remote NVMe driver and storage controller of the storage server (or of the NVMe drive) may operate together to enable hosts to access remote PCIe-based solid state drives (SSDs) with NVMe capabilities (referred to herein as NVMe drives or NVMe storage devices). All assumptions and rules of NVMe related to reliable transport and guaranteed delivery, traffic class and quality of service is preserved in embodiments. Additionally, all NVMe drives may be isolated such that they are only visible to appropriate hosts with permissions to access those NVMe drives. By enabling hosts to access remote NVMe drives, operational flexibility, and resource management and utilization can be improved. Additionally, hot-plug issues associated with NVMe drives, power limits and PCIe slot constraints of hosts, and load imbalances can be minimized. Embodiments enable storage resources to be balanced over time as needs change, enable sharing of storage resources between hosts, and provide data redundancy.

Embodiments are discussed with reference to virtual NVMe drives, physical NVMe drives, and an NVMe over Ethernet protocol. However, it should be understood that embodiments are also applicable to other solid state drives, such as other PCIe solid state drives that are not compatible with NVMe. Accordingly, embodiments discussed herein with reference to NVMe virtual drives also apply to other virtual drives. Additionally, embodiments discussed with reference to physical NVMe drives also apply to other solid state drives (SSDs), and embodiments discussed with reference to NVMe over Ethernet also apply in general to block storage over Ethernet.

FIG. 1 is a block diagram example of a network architecture 100, in which embodiments described herein may operate. The network architecture 100 may include one or more host computing devices (e.g., host computing devices 104A, 104B through 104N) connected to a storage server 101 via a network 106. Network 106 may be a wide area network (WAN) such as the Internet, a local area network (LAN), a storage area network (SAN) or a combination thereof. The host computing devices 104A-N and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-N). Storage server 101 may be configured as a storage area network (SAN), network attached storage (NAS), or other remote storage type. Though a single storage server 101 is shown, the host computing devices 104A-N may connect to multiple storage servers. The multiple storage servers may be arranged in a cluster or other configuration.

Storage server 101 includes multiple storage controllers 108A, 108B through 108N connected to multiple solid state drives (SSDs) 150A, 150B, 150C through 150N via a switch 110. The SSDs 150A-N may be SAS/SATA drives, non-volatile memory express (NVMe) drives, small computer system interface (SCSI) over PCIe (SOP) drives, or solid state drives that communicate using different protocols.

Embodiments are described herein with reference to NVMe drives. As discussed earlier, NVMe drives are PCIe-based solid state storage devices that uses the NVMe protocol. NVMe is a scalable host controller interface for PCIe-based solid state drives, which is based on a paired submission and completion queue mechanism. For NVMe, commands are placed by hosts into a submission queue. Completions are placed into an associated completion queue by the host controller. The number of SSDs included in storage server 101 may be less than 10 to more than 100. The solid state drives may have the same or different storage capacities.

Each storage controller 108A-N is a device configured to connect one or more host computing devices 104A-N to one or more SSDs 150A-N. Each storage controller 108A-N includes one or more network interface controllers (NICs) such as Ethernet NICs and/or other protocol adapters (e.g., such as FC, SAS/SATA, or Infiniband (IB) adapters) that connect that storage controller to network 106. Each storage controller 108A-N additionally includes a port that connects to switch 110 via an internal bus. In one embodiment, storage controllers 108A-N include peripheral component interconnect express (PCIe) ports that connect to switch 110 via a PCIe bus. Alternatively, or additionally, storage controllers 108A-N may include small computer system interface (SCSI) ports, serial attached SCSI (SAS) ports, serial ATA (SATA) ports, Fibre Channel ports, or universal serial bus (USB) ports or other ports for connecting to the switch 110. Storage controllers 108A-N may additionally include a volatile and/or non-volatile memory to store firmware and/or software for performing operations described herein. Volatile memory may also be used for a data cache or buffer (e.g., as a write cache and/or a read look ahead cache). For example, storage controllers 108A-N may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

Storage controllers 108A-N may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each storage controller 108A-N is a system on a chip (SoC) including a processing device, a memory, one or more NICs and one or more internal ports.

Each storage controller 108A-N is assigned to one or more host computing devices 104A-N, and handles input/output (I/O) commands for those host computing devices. Applications 135A-N running on a host computing device 104A-N may attempt to read data from and/or write data to a virtual drive 180A-N that the host computing device 104A-N has access to. Responsive to such a read or write request, a remote NVMe driver 179A-N running on the host computing device 104A-N encapsulates a read or write command into a message (e.g., into an Ethernet packet) and sends the message to the storage controller 108A-N that is assigned to that host computing device 104A-N.

When the storage controller 108A-N receives the read or write command from the host computing device 104A-N, the storage controller 108A-N extracts the read or write command from the message and determines what logical addresses of the virtual drive 180A-N should be used to write the data to or read the data from. The storage controller 108A-N may additionally translate the logical addresses of the virtual drive to physical addresses of the SSDs 150A-N. For example, if a read command was received, the storage controller 108A-N may determine which SSDs 150A-N store the information to be read as well as which physical addresses on those SSDs the data should be read from. In another example, if a write command was received, the storage controller 108A-N may determine which SSDs 150A-N to write portions of received data to as well as which physical addresses of those SSDs 150A-N to write the data to. The storage controller 108A-N may then generate one or more NVMe commands directed to the determined SSDs 150A-N to write data to those SSDs or read data from those SSDs 150A-N. Alternatively, if the received command or commands were NVMe commands, then the storage controller 108A-N may determine which SSDs 150A-N to forward the NVMe commands to and/or send the NVMe commands to the appropriate SSDs 150A-N.

Storage controllers 108A-N may additionally include array configuration information for the SSDs 150A-N that may be used to reconstruct data of one or more virtual drives 180A-N if one or more of the SSDs 150A-N becomes unavailable. If a read command is received while one or more SSDs 150A-N are unavailable, a storage controller may retrieve data from the available SSDs and then reconstruct missing data that is stored by the unavailable SSD (or unavailable SSDs) from the retrieved data. Storage controller 108A-N may then satisfy the read command using the reconstructed data.

Switch 110 is a multi-port bridge that connects storage controllers 108A-N to SSDs 150A-N. Switch 110 manages the flow of data within storage server 101 by connecting specific storage controllers 108A-N to specific SSDs 150A-N on a message by message basis, allowing the switch 110 to regulate the flow of traffic. Each storage controller 108A-N and each SSD 150A-N connected to switch 110 can be identified using a unique address (e.g., a unique port address) of the storage controller or SSD. Switch 110 may be a PCIe switch, an Ethernet switch, a SAS or SATA expander, a USB switch, or other type of switch.

Each solid state drive (SSD) 150A-N (also referred to as a solid state storage device) is a non-volatile storage device that uses integrated circuits to persistently store data. SSDs 150A-N have numerous advantages over traditional disk drives. As compared to disk drives, SSDs are more resilient, consume less power, and have lower latency (access times). In one embodiment, SSDs 150A-N are NAND-based Flash memory devices or NOR-based Flash memory devices. Flash memory devices are non-volatile and can be electronically erased and reprogrammed. Alternatively, one or more SSDs 150A-N may be volatile memory-based solid state drives (e.g., dynamic random access memory (DRAM)-based SSDs) that have a battery backup. SSDs 150A-N may include one or more ports (e.g., PCIe ports) to connect to switch 110. SSDs 150A-N may connect to switch 110 via PCIe, SCSI. SAS, USB, or other connection protocols. In one embodiment, SSDs 150A-N are NVMe drives.

Each SSD 150A-N has a controller and a storage area that includes memory (e.g., NAND Flash non-volatile memory) to store data. The storage area is divided into memory pages, which is the smallest unit of storage to which data may be stored. Memory pages may have sizes based on a configuration of an SSD. For example, SSDs 150A-N may have memory pages that are 8 kilobytes (kB) or 16 kB. However, other memory page sizes are also possible. Memory pages are grouped into blocks. Each block contains a particular number of memory pages, which is again dependent on a design of a particular SSD. Typical SSDs have blocks that include 256 memory pages.

Storage server 101 additionally includes an array manager 115. Array manager 115 may be a device configured to perform particular operations with regards to management of the array of SSDs 150A-N. Array manager 115 may include a processing device, a port for connecting to switch 110 and a NIC for connecting to network 106. Array manager 115 may additionally include a volatile and/or non-volatile memory to store firmware and/or software for performing operations described herein. In one embodiment, array manager 115 is a SoC.

The array manager 115 determines how to configure the array of SSDs 150A-N and further determines configurations for the one or more virtual drives 180A-N. For example, array manager 115 may determine which virtual drives map to which physical SSDs and which portions of those SSDs the virtual drives map to. Once these configurations are determined, array manager 115 may send these configurations to the storage controllers 108A-N for implementation. Array manager 115 additionally performs discovery operations and may be responsible for paring storage controllers 108A-N with host computing devices 104A-N. Discovery operations may be initiated when storage server 101 powers on and/or to connect host computing devices to new or updated virtual drives.

Host computing devices 104A-N may each include a physical machine and/or a virtual machine hosted by a physical machine. The physical machine may be a rack-mount server, a desktop computer, or other computing device. In one embodiment, one or more host computing device 104A-N includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-N may host one or more applications 135A, 135B through 135N. The applications 135A-N may be application servers, web servers, standalone applications, and so forth. Accordingly, host computing devices 104A-N may provide services to clients via applications 135A-N in some embodiments.

Each host computing device 104A-N may additionally mount or otherwise connect to one or more virtual drives 180A, 180B through 180N (e.g., one or more logical unit numbers (LUNs) and/or one or more virtual NVMe drives). Though each host computing device 104A-N is shown to mount a different virtual drive 180A-N, different host computing devices may mount or connect to the same virtual drive. Each virtual drive 180A-N is a logical storage device that maps a logical storage address space to physical storage address spaces of multiple storage devices (e.g., solid state drives (SSDs) 150A, 150B, 150C through 150N of storage server 101). Additionally, a virtual drive 180A-N may map a logical storage address space to physical storage address spaces of storage devices on multiple different storage servers. In one embodiment, the virtual drives 180A-N are virtual NVMe drivers. Accordingly, drivers on hosts 104A-N may issue commands to the virtual drives 180A-N using the NVMe protocol.

Each host computing device 104A-N includes a remote NVMe driver 179A-N that communicates with storage controllers 108A-N, 190. The remote NVMe driver 179A-N may terminate I/O commands and then generate new I/O commands and encapsulate the new I/O commands into messages (e.g., Ethernet packets) in accordance with a block storage over Ethernet (e.g., a NVMe over Ethernet) protocol. The new I/O commands may be NVMe commands or commands specific to the block storage over Ethernet protocol. These new messages (Ethernet packets) may then be sent through network 106 to a storage controller 108A-N, 190 that is assigned to the host computing device 104A-N on which the remote NVMe driver 179A-N runs. Alternatively, the remote NVMe driver 179A-N may receive NVMe I/O commands, encapsulate the NVMe I/O commands into messages such as Ethernet packets, and send the messages to the appropriate storage controllers 108A-N, 190.

Remote NVMe drivers 179A-N additionally receive responses to I/O commands that are encapsulated in messages such as Ethernet packets. The remote NVMe driver 179A-N may extract the responses from the messages, and then send the responses on to applications 135A-N. Alternatively, the remote NVMe drivers 179A-N may terminate the responses and generate a new responses that are then sent to the applications 135A-N.

In one embodiment, the network architecture 100 includes an SSD 188 connected to network 106. SSD 188 is similar to SSDs 150A-N, but additionally includes a storage controller 190. Storage controller 190 is similar to storage controllers 108A-N. SSD 188 may be an NVMe drive. Storage controller 190 may communicate with remote NVMe drivers 179A-N via the NIC, and may remove I/O commands from received messages and generate NVMe I/O commands for other components of the SSD 188. Alternatively, storage controller 190 may extract NVMe commands from received messages and may forward the NVMe commands to additional components of the SSD 188. There may be a one-to-one mapping between a virtual drive 180A-N and SSD 188. Accordingly, storage controller 190 may forward extracted NVMe commands received from hosts 104A-N with minimal or no modification.

Figure 2A:
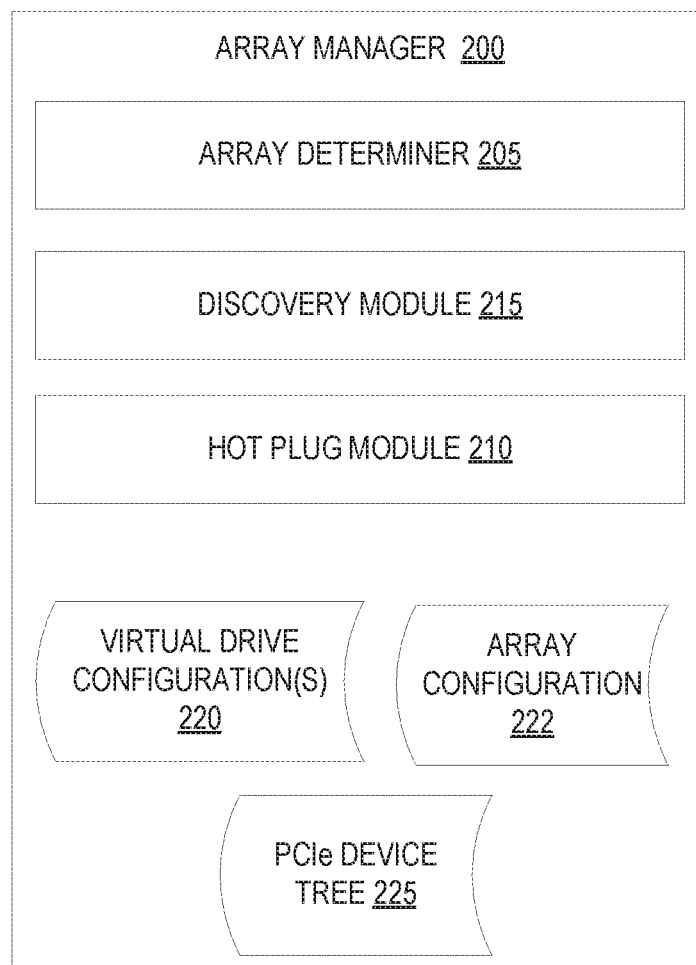
FIG. 2A is a block diagram of one embodiment of an array manager.

FIG. 2A is a block diagram of one embodiment of an array manager 200 showing logical modules that may be loaded into and executed by a processing device of array manager 200. Alternatively, array manager 200 may include one or more physical modules (e.g., an integrated circuit (IC) designed with described modules or a configurable logic such as a field programmable gate array (FPGA) configured to have the modules). In one embodiment, array manager 200 includes the modules of an array determiner 205, a hot plug module 210 and a discovery module 215. Alternatively, the functionality of the array determiner 205, hot plug module 210 and/or discovery module 215 may be divided into additional modules or may be combined into a single module. In one embodiment, array manager 200 corresponds to array manager 115 of FIG. 1.

Array determiner 205 identifies available storage devices and may determine how those storage devices are to be configured into an array, and may store such information as array configuration 222. Array determiner 205 additionally determines how to divide the array of storage devices into virtual drives (e.g., into virtual NVMe drives), and this information may be included in virtual drive configuration(s) 220. Array determiner 205 may determine how many virtual drives to create, the sizes of those virtual drives, and what physical addresses of the storage devices to allocate to each virtual drive. Once the configurations for the virtual drives are determined, array determiner 205 sends the virtual drive configurations 220 to storage controllers. The storage controllers may then use the received virtual drive configurations 220 to establish and maintain the virtual drives.

In one embodiment, array determiner 205 generates a PCIe device tree 225 representing a maximal topology of a storage server when the storage server is powered up. PCIe device tree 225 represents a maximum number of storage controllers and NVMe drives that may be included in the storage server. The PCIe device tree 225 represents the maximal topology so that the device tree does not need to be rebuilt or rebalanced when storage controllers and/or NVMe drives are discovered. Each of the devices in the PCIe device tree are placeholders initially. When storage controller or NVMe drives are discovered, the placeholders are replaced with information for real devices without otherwise changing the PCIe device tree 225.

Discovery module 215 performs discovery operations to enable discovery of hosts having a block storage over Ethernet (e.g., NVMe over Ethernet) capability and to enable discovery of available NVMe storage devices. When a storage server including the array manager 200 is connected to a network, powered up or reset, the array manager 200 determines the available virtual drives from virtual drive configurations 220. Discovery module 215 then sends messages to all hosts on the network for each of the available virtual drives. Each message is a notification that identifies one or more virtual drives by name and/or other identifier and that includes network addresses for the one or more virtual drives. Discovery module 215 may broadcast a notification on a particular subnet, may multicast the notification to the hosts or may send individual messages to each of the hosts. For example, array manager 200 may maintain a list of known hosts, and discovery module 215 may send messages to each of the hosts in the list. Additionally, when a new virtual drive is created, discovery module 215 may send (e.g., broadcast) a notification of the new virtual drive to the hosts.

Responsive to receiving notification of a virtual drive, a remote NVMe driver on a host determines whether to connect to the virtual drive. The remote NVMe driver may determine to connect to a virtual drive, for example, if the virtual drive has a name or other identifier that matches a name or identifier previously stored by the remote NVMe driver. Responsive to determining to connect to a virtual drive, the remote NVMe driver sends a message to the network address associated with that virtual drive. The network address corresponds to an address of a storage controller that is configured to provide the virtual drive. The storage controller is further connected to the physical NVMe drives that map to the virtual drive. Accordingly, once the storage controller receives the message from the NVMe driver, a tunnel is established between the host and the physical NVMe drives by the storage controller. This enables the host to access the remote NVMe drives without management.

In the case of a stand-alone SSD that is connected to a network, the SSD may broadcast a notification on the network when the SSD is connected to the network and/or powered up. A host may then respond to the notification to establish a connection to the SSD. The host and SSD may be peers on the network.

When a host is started up or added to the network, an NVMe driver on the host may additionally send a discovery message. This discovery message may be sent to the array manager 200 if the host includes a network address of the array manager. Alternatively, the discovery message may be broadcast (e.g., on a subnet that the host is connected to). The discovery message may or may not identify a name or other identifier of one or more virtual drives that the host is assigned to. Responsive to receiving a discovery message, discovery module 215 may determine which virtual drives are assigned to the host, and may then determine which storage controller (or storage controllers) are responsible for the determined virtual drive (or virtual drives). Discovery module 215 may then send a message to the storage controller identifying the host (e.g., by network address, media access control (MAC) address, etc.) and/or may send a message to the host identifying the storage controller. The host may then establish a direct connection to the storage controller (and a tunnel may be established between the host and the physical NVMe drives).

Additionally or alternatively, a storage controller receiving the discovery message from the NVMe driver may determine that the storage controller is assigned to provide one or more virtual drives to the host. Accordingly, the storage controller may respond to the discovery message with a response identifying a network address for the host to use for I/O messages to the one or more virtual drives.

Once connections are established between hosts and storage controllers, the storage controllers and/or hosts may send periodic heartbeat messages to verify that the connection is maintained.

Hot plug module 210 is responsible for enabling NVMe drives to be plugged and unplugged from a storage server during operation (e.g., without powering down the storage server). Thus, NVMe drives may be removed from and inserted into the storage server at arbitrary times. Hot plug module 210 may detect a new NVMe drive when that drive is inserted into the storage server. Hot plug module 210 then determines if there is sufficient power to operate the NVMe drive and other components of the storage server. If there is sufficient power, hot plug module 210 activates the NVMe drive (e.g., provides power to the NVMe drive) and replaces a placeholder in the PCIe device tree 225 with information for the new NVMe drive.

Hot plug module 210 may additionally detect when an NVMe drive is being unplugged from the storage server. Hot plug module 210 may use one or a few detection techniques to detect when the NVMe drive is unplugged. In a first technique, the hot plug module 210 detects that a physical presence link to the NVMe drive becomes inactive. In a second technique, the hot plug module 210 determines that the NVMe drive has been unplugged after the NVMe drive fails to respond to one or more PCIe messages (low level PCIe communications).

Responsive to detecting the imminent removal of the NVMe drive, hot plug module 210 may send messages to all storage controllers and hosts that are using the NVMe drive (e.g., that are using a virtual NVMe drive that maps to the NVMe drive). This enables the hosts and storage controllers to reach a quiescent state and de-allocate any resources being consumed with reference to the NVMe drive. Once all of the hosts using the NVMe drive have relinquished use of the NVMe drive, host plug module 210 may send messages to the storage controllers to disconnect from the NVMe drive. Hot plug module 210 may then replace the NVMe drive in the PCIe device tree 225 with a placeholder, and may turn off the NVMe drive.

Figure 2B:
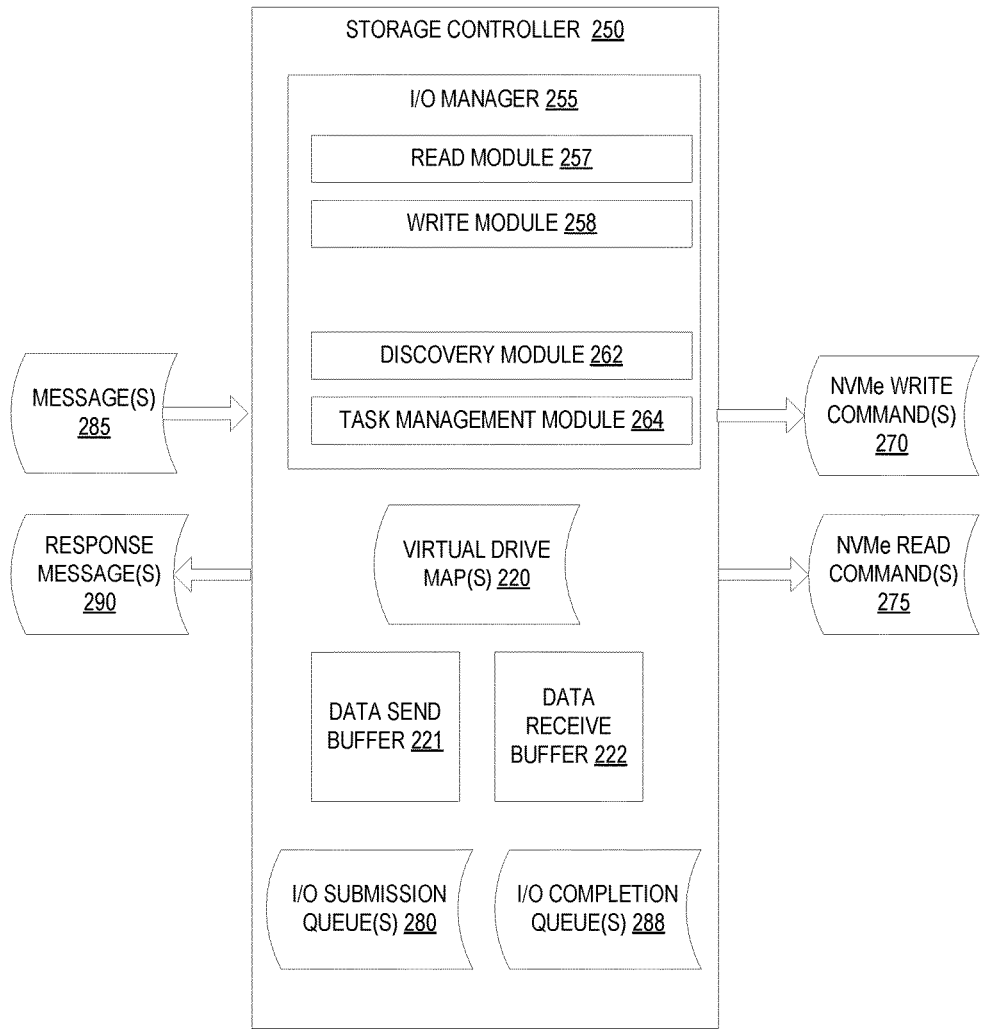
FIG. 2B is a block diagram of one embodiment of a storage controller.

FIG. 2B is a block diagram of one embodiment of a storage controller 250 showing logical modules that may be loaded into and executed by a processing device of storage controller 250. Alternatively, array manager storage controller 250 may include one or more physical modules (e.g., an integrated circuit (IC) designed with described modules or a configurable logic such as a field programmable gate array (FPGA) configured to have the modules). In one embodiment, storage controller 250 includes the module of an input/output (I/O) manager 255. The I/O manager 255 in one embodiment includes a read module 257, a write module 258, a discovery module 262 and a task management module 250. Alternatively, the functionality of the read module 257, write module 258, discovery module 262 and/or task management module 264 may be distinct modules that are separate from I/O manager 255. In one embodiment, storage controller 250 corresponds to a storage controller 108A-N of FIG. 1.

I/O manager 255 is responsible for communicating with host computing devices and satisfying input/output (I/O) commands such as read commands and write commands from the host computing devices. Storage controller 250 receives messages 285 from host computing devices. The messages may be, for example, Ethernet packets. The received messages 285 may contain I/O commands encapsulated in the messages and/or data encapsulated in the messages 285. Responsive to receipt of a message from a host, I/O manager 255 may remove an I/O command and/or data from the message and determine which module 257-264 should handle the data or I/O command.

In one embodiment, each of the messages 285 is an Ethernet packet having a particular format and encapsulating an I/O command. The Ethernet packet may include a transport header identifying a destination address (e.g., a destination MAC address), a source address (e.g., a source MAC address), and a virtual local area network (VLAN) tag (if appropriate). In one embodiment, a payload of the Ethernet packet includes an NVMe command. Alternatively, or additionally, a payload of the Ethernet packet may include a protocol header for the I/O command and a particular command payload and/or data payload. The protocol header includes an identifier (ID) of a virtual drive (e.g., a LUN identifier for a virtual NVMe drive) and a command identifier. The command identifier may identify the I/O command as one of a discovery command, a discovery response command, a send command, a response command, a data-in command, a data-out command or a task management command. Each command may be associated with a specific unique command ID. For some commands such as the send command, there are multiple different types of sub-commands. For example, the send command may be for a read command, a write command, or a status update command.

The command payload includes specific command instructions, such as specific read or write instructions. The specific command instructions may be NVMe command instructions (e.g., NVMe read commands or NVMe write commands), or may include other read or write commands. The data payload includes data to be written to storage or data that has been retrieved from storage. Once the I/O command has been removed from the Ethernet packet, I/O manager determines what type of I/O command has been received based on the included command ID and/or based on the command payload. If the I/O command is an NVMe command, then processing logic may identify an NVMe drive and forward the NVMe command to the identified NVMe drive.

In one embodiment, after extracting an I/O command from a received message, I/O manager 255 validates the I/O command by determining whether a host that generated the I/O command has access to a virtual drive indicated in the I/O command and/or to logical block addresses indicated in the I/O command. If the I/O command is not successfully validated, then it may be discarded. If the I/O command is validated, then NVMe commands may be generated and sent to NVMe drives to satisfy the I/O command.

Responsive to receipt of a read command, I/O manager 255 invokes read module 257. Read module 257 is responsible for responding to read commands. In one embodiment, the command payload of the read command identifies specific logical block addresses of a virtual drive (e.g., a virtual NVMe drive) from which data is to be read. For example, the command payload may identify a particular logical block address and a length. Read module 257 may use a virtual drive map 220 for the virtual drive to determine what locations (e.g., what memory pages) on the physical storage devices (e.g., physical NVMe drives) correspond to the logical block addresses of the virtual drive.

Read module 257 may then generate NVMe read commands 275 for each of the storage devices storing data to be read. For example, if a virtual NVMe drive maps to three physical NVMe drives, read module 257 may determine first memory pages on a first NVMe drive storing requested information, second memory pages on a second NVMe drive storing requested information and third memory pages on a third NVMe drive storing requested information. Read module 257 may then generate a first NVMe read command directed to the first memory pages of the first NVMe drive, a second NVMe read command directed to the second memory pages of the second NVMe drive, and a third NVMe read command directed to the third memory pages of the third NVMe drive. The NVMe read commands may be placed into I/O submission queues 280 for each of the NVMe drives that are managed by the I/O manager. Once an NVMe read command reaches the front of an I/O submission queue 280, read module 257 may then send the generated NVMe read command to the appropriate NVMe drive.

The NVMe drives receive the NVMe read commands and return data stored at indicated memory locations. The returned data is added to a data send buffer 221 by read module 257 until the data send buffer 221 fills or all requested data has been received. In one embodiment, the data send buffer 221 has a size that corresponds approximately to a maximum allowed size of an Ethernet packet. Once the data send buffer 221 fills, read module 257 may generate a response message 290 (e.g., a new Ethernet packet having the above identified format). Read module 257 may then encapsulate the data from the data send buffer 221 into the response message 290. For example, read module 257 may generate an Ethernet packet with a transport header indicating the MAC addresses of the requesting host device and of the storage controller 250. The Ethernet packet may also include in its payload a protocol header identifying a Data-In I/O command, may include a command payload for the Data-In I/O command and/or may include a data payload with the data from the data send buffer 221. Read module 257 may then send the response message 290 to the host.

Read module 257 may continue to create and send response messages incorporating retrieved data as the data send buffer 221 fills. Once all of the data has been retrieved, a final response message 290 may include in its protocol header a command ID for a completion notification. The completion notification may notify the host that all data has been retrieved and that the requested read command has been satisfied. Additionally, as specific NVMe read commands sent to the NVMe drives are satisfied by the NVMe drives, read module 257 may place those NVMe read commands into an I/O completion queue 288. These NVMe read commands may be cleared from the I/O completion queue once the retrieved data has been sent to the host.

In one embodiment, responsive to receipt of a write command, I/O manager 255 invokes write module 258. Write module 258 is responsible for responding to write commands. In one embodiment, the command payload of the write command identifies a length of data to be written. Write module 258 may determine what logical block addresses to write the data to, and may use the virtual drive map 220 for the virtual drive to determine what locations (e.g., what memory pages) on the physical storage devices (e.g., physical NVMe drives) correspond to the logical block addresses of the virtual drive. Alternatively, the logical block addresses (e.g., a starting logical block address and length) may be indicated in the write command.

Following the message (e.g., Ethernet packet) encapsulating the write command, storage controller 250 may receive additional messages identifying the particular write command and encapsulating a data out I/O command and data to be written that is associated with the write command. Since Ethernet packets have a dictated maximum size, the data to be written may be broken up into portions, where each portion can be encapsulated within a separate Ethernet packet. I/O manager 255 removes the data from each such message (e.g., from each Ethernet packet) and provides the data to write module 258. Write module 258 may add the received data extracted from the Ethernet packets (or other messages) into a data receive buffer 222.

Write module 258 may then generate NVMe write commands 275 for each of the storage devices to which the data will be written. For example, if a virtual NVMe drive maps to three physical NVMe drives, write module 258 may determine that a first data portion is to be written to first memory pages on a first NVMe drive, a second data portion is to be written to second memory pages on a second NVMe drive, and a third data portion is to be written to third memory pages on a third NVMe drive. Write module 258 may then generate a first NVMe write command to write the first data portion to the first memory pages of the first NVMe drive, a second NVMe write command to write the second data portion to the second memory pages of the second NVMe drive, and a third NVMe write command to write the third data portion to the third memory pages of the third NVMe drive. The NVMe write commands may be placed into I/O submission queues 280 for each of the NVMe drives that are managed by the I/O manager. Once an NVMe write command reaches the front of an I/O submission queue 280, write module 258 may then send the generated NVMe write command to the appropriate NVMe drive.

The NVMe drives receive the NVMe write commands and write the data portions to the specified locations. The NVMe drives then return a completion notification. These completion notifications may be added to the I/O completion queue 288. Once completion notifications have been received from each of the NVMe drives to which data was written (and in some embodiments these completion notifications reach a front of the I/O completion queue), write module 258 may generate a response message 290 (e.g., a new Ethernet packet having the above identified format). Write module 258 may then encapsulate the completion notification into the response message 290. For example, write module 258 may generate an Ethernet packet with a transport header indicating the MAC addresses of the requesting host device and of the storage controller 250. The Ethernet packet may also include in its payload a protocol header identifying a completion notification I/O command (also referred to as a response I/O command) and may include a command payload for the completion notification that identifies the specific I/O command that has completed. Write module 258 may then send the response message 290 to the host.

Responsive to receipt of a discovery command, I/O manager 255 invokes discovery module 262. Discovery module 262 is responsible for responding to discovery commands and otherwise participating in the discovery process. When a host is reset or otherwise is to connect to a virtual drive, that host sends a discovery command that includes a connection request to an array manager and/or storage controllers, as described with reference to FIG. 2A. The host is notified of the storage controller that will provide the virtual drive to the host. If notified by the array manager, the host sends a discover command that includes a connection request to the storage controller 250. The discovery module 262 determines whether to accept the connection request. The acceptance or rejection of the connection request may be determined based on permissions of the host. If the host has permission to access the virtual drive, then the connection request may be granted. In one embodiment, acceptance of the connection request is implied. Accordingly, if the connection request is granted then the host may begin sending I/O commands such as read and write commands without waiting for a response from the storage controller 250. Alternatively, the storage controller 250 may send a connection response to the host. The connection response may identify an address of the storage controller 250.

Responsive to receipt of a task management command, I/O manager 255 invokes task management module 264. Task management module 264 is responsible for managing tasks. Task management commands may indicate a specific I/O command to cancel or multiple I/O commands to cancel. A task management command may also specify to cancel all pending I/O commands. Task management commands may be sent by a host (e.g., by an NVMe driver on a host) if a threshold amount of time has passed since one or more I/O commands were sent. Responsive to receipt of a task management command, task management module 264 determines the status of the command or commands specified in the task management command. Commands that have already been completed may be reported back to the host normally. Commands that have not yet been processed may be canceled. In one embodiment this includes determining the specific NVMe commands that may have been generated for the I/O command and removing these specific NVMe commands from one or more I/O submission queues 280. If any commands are partially completed, then task management module 264 may either wait for the command to complete or may cancel the command and roll back any state changes caused by the command.

Figure 3:
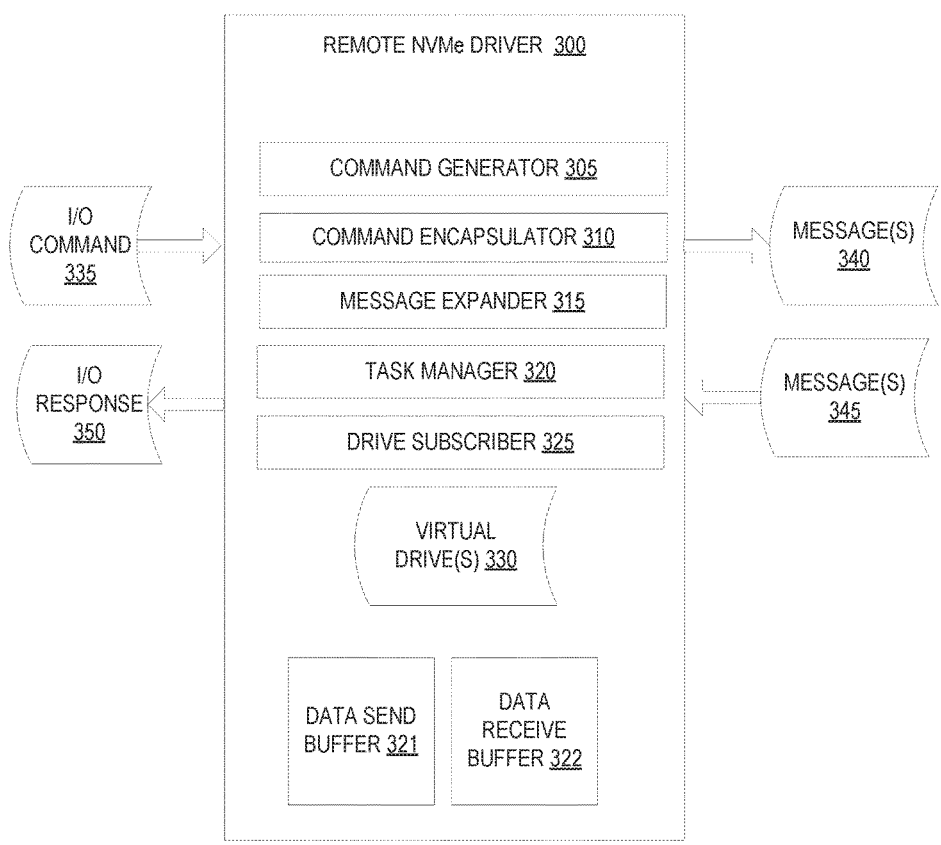
FIG. 3 is a block diagram of one embodiment of a remote NVMe driver.

FIG. 3 is a block diagram of a remote NVMe driver 300 installed on a host computing device. In one embodiment, remote NVMe driver 300 corresponds to remote NVMe drivers 279A-N of FIG. 1. Remote NVMe driver 300 may include a command generator 305, a command encapsulator 310, a message expander 315, a task manager 320 and a drive subscriber 325. The functionality of one or more of the command generator 305, command encapsulator 310, message expander 315, task manager 320 and/or drive subscriber 325 may be combined into a single module or divided into multiple additional modules.

Remote NVMe driver 300 receives I/O commands 335 such as read commands and write commands from a host on which the remote NVMe driver 300 executes. The I/O commands may be received from an operating system of the host and/or from an application hosted by the host. In one embodiment, remote NVMe driver 300 terminates I/O commands received from the host. Remote NVMe driver 300 additionally invokes command generator 305, which creates a new command that corresponds to the terminated I/O command 335. For example, if the received I/O command 335 was a read command, then command generator may generate a new read command that complies with a particular block storage over Ethernet (e.g., NVMe over Ethernet) protocol.

Similarly, if the received I/O command 335 was a write command, then command generator 305 may generate a new write command that complies with the particular block storage over Ethernet (e.g., NVMe over Ethernet) protocol. The generated command may include a protocol header that indicates a virtual drive associated with the command and a command type (e.g., a send command, response command, task management command, discovery command, etc.). The generated command may additionally include a command payload that may or may not specify specific logical block addresses to read from or write to, a length of data to be written, and/or other information.

Additionally, for a write command, command generator 305 may allocate a data send buffer 321 and fill the data send buffer with data to be written. Command generator 305 may generate multiple commands, with each command including a portion of the data in the data send buffer 321. A first generated command may be a write command specifying an amount of data to be written, and subsequent commands may be data-out commands containing the data to be written. Each I/O command may have a size that fits within a payload of an Ethernet packet.

Command generator 305 may also create commands that do not correspond to any received I/O commands. For example, command generator 305 may generate task management commands responsive to being invoked by task manager 320 and may create discovery commands responsive to being invoked by drive subscriber 325.

Command encapsulator 310 generates a message 340 such as an Ethernet packet and encapsulates a generated I/O command into the message. Alternatively, a received I/O command 335 may be passed through to a storage controller. In such an embodiment, command generator 305 may not generate a new I/O command. Instead, or in addition, command encapsulator 310 may generate a message 340 such as an Ethernet packet and encapsulate the received I/O command into the message. In one embodiment, the received I/O command 335 is an NVMe I/O command directed to a virtual drive 330, which may be mounted to the host. Alternatively, the I/O command 335 may not be an NVMe command. The message 340 may include a transport header that indicates an address (e.g., a MAC address) of a storage controller that provides the virtual drive 330 to the host and that further indicates an address of the host.

Remote NVMe driver 300 sends generated messages 340 to one or more storage controllers indicated in the messages. Task manager 320 may record a time that a message encapsulating a particular I/O command was sent. Task manager 320 may then wait for a response message 345 to the message 340. If a response message 345 is not received within a threshold time period from when the message 340 was sent, then task manager 320 may invoke command generator 305 to create a task management command that will cause the previously issued I/O command to be canceled. Task manager 320 may cause command generator 305 to create a task management command to cancel a specific previous command or to cancel some or all previous commands. Each command generated by command generator 305 may be assigned a unique identifier. For example, command generator 305 may increment a counter each time a new command is generated and assign the current counter value to the new command. A specific command may be targeted for cancelation by identifying the unique identifier of that command in the task management command.

When a response message 345 is received, message expander 315 may extract an I/O command or notification from the response message. The extracted I/O command or notification may include a protocol header, a command payload and/or a data payload. Message expander 315 identifies a previously sent command associated with the received I/O command or notification (e.g., based on a unique ID associated with the received I/O command). If the received I/O command or notification includes data associated with a previously sent I/O command, message expander 315 may add the data to a data receive buffer 322. Once message expander 315 identifies an I/O command or notification indicating status completion of a previously sent read command, message expander 315 may determine that all of the data has been received. Message expander 315 may then provide an I/O response 350 to the host that includes the data from the data receive buffer 322. If the received I/O command or notification is status completion to a previous write command, message expander 315 may generate an I/O response 350 indicating that the write command has been completed, and send the I/O response 350 to the host. For some response messages such as those encapsulating responses to task management commands or discovery commands, no I/O responses may be sent to the host. Alternatively, I/O responses may be sent to the host for such response messages.

Drive subscriber 325 is responsible for establishing connections to one or more storage controllers and for mounting one or more virtual drives 330. Responsive to remote NVMe driver 300 starting up (or a host on which NVMe driver 300 is installed starting up), drive subscriber 325 may cause command generator 305 to generate a discovery command. The discovery command may be encapsulated by command encapsulator 310 and then broadcast on a network (e.g., on a specific sub-network to which the host is attached). An array manager and/or storage controller may respond to the discovery command. The response may identify the storage controller that will provide one or more virtual drives to the host.

In some embodiments, remote NVMe driver 300 may mount a virtual drive 330 that spans NVMe drives on multiple storage servers. In such an embodiment, command generator 305 may generate two or more read commands responsive to receipt of a read command from a host process and directed to the virtual drive 330. Each read command would be directed to a storage controller on a different storage server. Responsive to receiving responses from the various storage controllers, message expander 315 may assemble read data based on information on the arrangement of NVMe drives and/or based on information included in the response messages.

Similarly, multiple write commands may be generated responsive to receiving a write command to a virtual drive 330 that spans NVMe drives on multiple storage servers. Each write command may be addressed to a storage controller of a different storage server. Data to be stored may also be partitioned and different data portions may be sent to each of the storage controllers.

Figure 4:
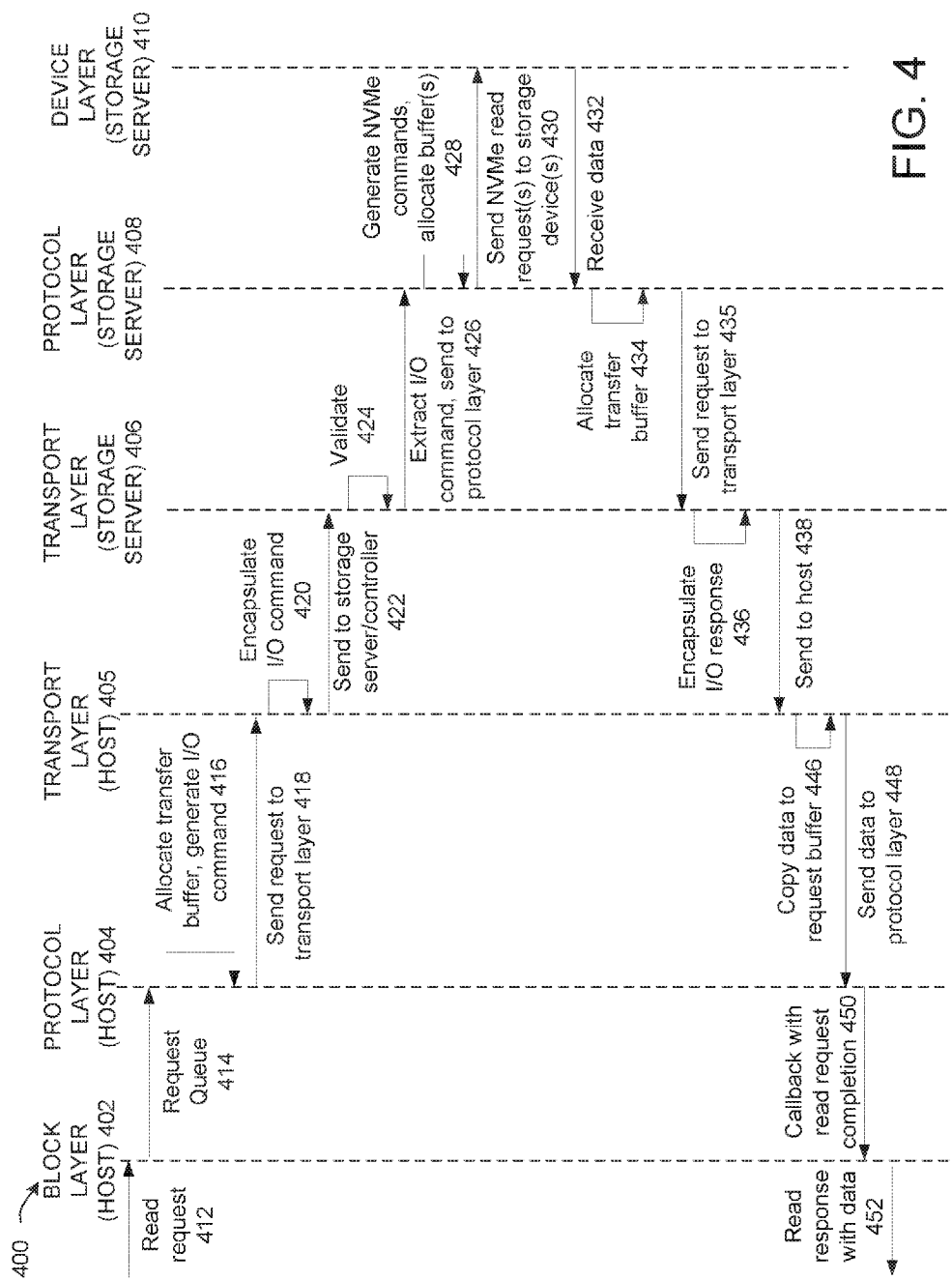
FIG. 4 is a sequence diagram showing a read request to a remote NVMe storage device, in accordance with one embodiment.

FIG. 4 is a sequence diagram 400 showing a read request to a remote NVMe storage device, in accordance with one embodiment. The sequence diagram 400 shows different layers of a host and a storage server that perform various operations to satisfy a read request. The illustrated layers of the host include a block layer 402, a protocol layer 404 and a transport layer 405. The operations of the block layer 402, protocol layer 404 and/or transport layer 405 may be performed by a remote NVMe driver. The illustrated layers of the storage server include a transport layer 406, a protocol layer 408 and a device layer 410. The operations of the transport layer 406 and protocol layer 408 may be performed by a storage controller. The operations of the device layer 410 may be performed by storage devices.

In accordance with the sequence diagram 400, the block layer 402 receives a read request 412 from an application layer (e.g., from an application or operating system). The block layer 402 sends an allocate queue request 414 to the protocol layer 404. The protocol layer then allocates a transfer buffer and generates an I/O command in the transfer buffer 416. The I/O command may include a protocol header, a command payload and a data payload. The protocol layer 404 then sends a request to the transport layer 405 to encapsulate the I/O command 418.

The transport layer 405 encapsulates the I/O command 420. This may include filling a transport layer header of an Ethernet packet containing the I/O command. The transport layer 405 at the host then sends 422 the Ethernet packet to the transport layer 406 at the storage server 406.

The transport layer 406 validates 424 the received Ethernet packet. This may include determining whether the host is authorized to communicate with the storage server. If the Ethernet packet is successfully validated, the transport layer 406 extracts the I/O command from the Ethernet packet and sends 426 the I/O command to the protocol layer 408.

The protocol layer 408 allocates a buffer for the I/O command and generates one or more NVMe read commands based on the received I/O command (a read command) 428. The protocol layer 408 then sends the NVMe read commands 430 to the device layer 410 (e.g., to the storage devices holding the data to be read). The device layer 410 provides the requested data 432 to the protocol layer 408. The protocol layer 408 allocates a transfer buffer and generates an I/O response in the transfer buffer 434. The I/O response includes a protocol header, a command payload and/or a data payload that are sized to fit inside of an Ethernet packet. The protocol layer 408 then sends a request 435 to the transport layer 406. The transport layer 406 encapsulates the I/O response in an Ethernet packet 436. This includes adding a transport layer header to the Ethernet packet. The transport layer 406 then sends 438 the Ethernet packet to the host.

The operations of allocating the transport buffer 434, creating the I/O response 434, encapsulating the I/O response in an Ethernet packet 436 and sending the Ethernet packet to the host 438 may be repeated until all requested data has been transmitted to the host. A final I/O response that is generated includes a status completion command or notification that notifies the host that all of the requested data indicated in the read request has been returned.

For each received Ethernet packet, the transport layer 405 extracts data from the Ethernet packet and adds the data to a request buffer 446. Once the status completion command is received, the transport layer 405 sends the data 448 to the protocol layer 404. The protocol layer 404 then performs a callback 450 to the block layer 402 indicating a read request completion. The block layer 402 then provides a read response with the data 452 to the application layer.

Figure 5:
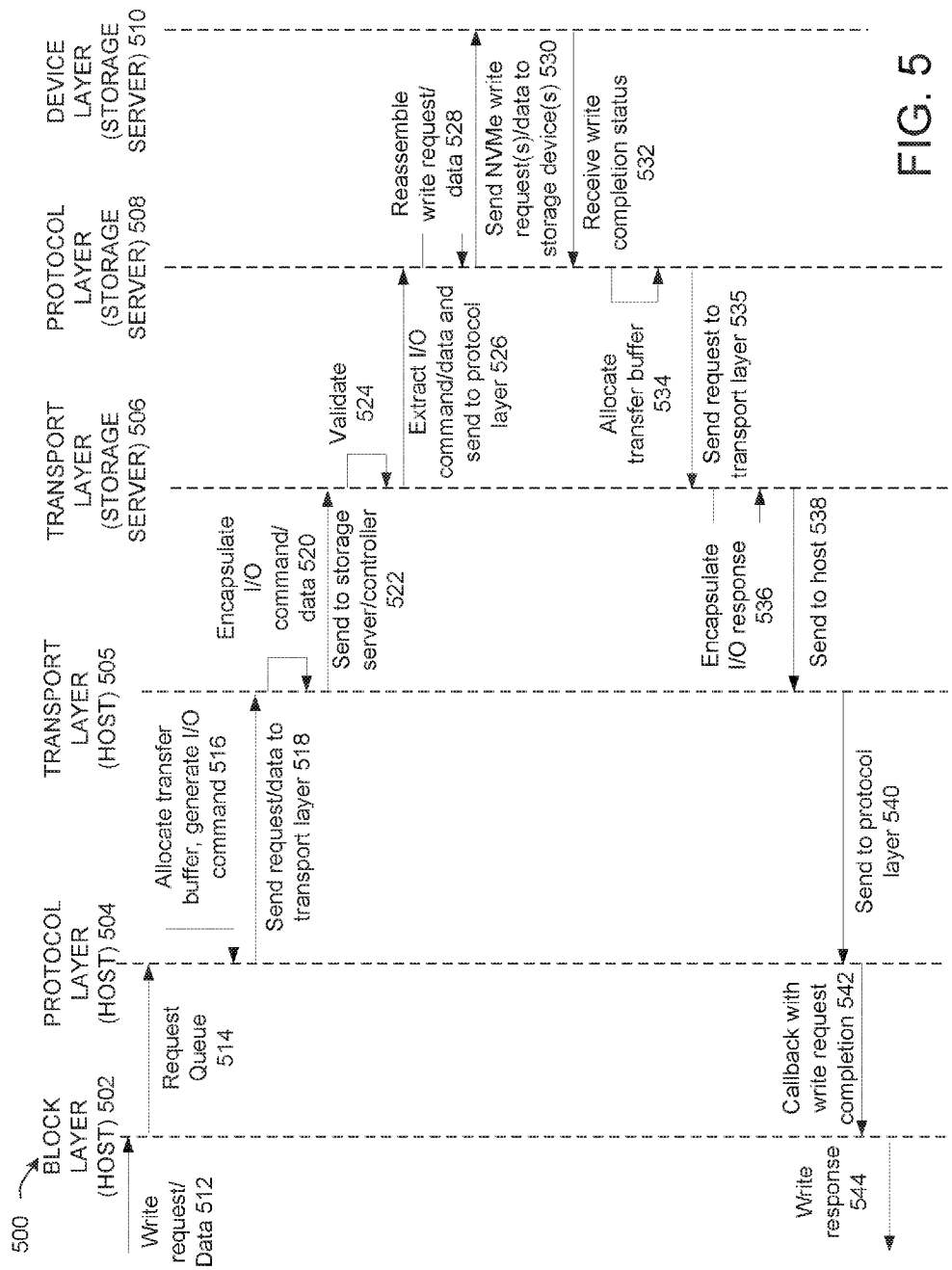
FIG. 5 is a sequence diagram showing a write request to a remote NVMe storage device, in accordance with one embodiment.

FIG. 5 is a sequence diagram showing a write request and associated data to a remote NVMe storage device, in accordance with one embodiment. The sequence diagram 500 shows different layers of a host and a storage server that perform various operations to satisfy a write request. The illustrated layers of the host include a block layer 502, a protocol layer 504 and a transport layer 505. The operations of the block layer 502, protocol layer 504 and/or transport layer 505 may be performed by a remote NVMe driver. The illustrated layers of the storage server include a transport layer 506, a protocol layer 508 and a device layer 510. The operations of the transport layer 506 and protocol layer 508 may be performed by a storage controller. The operations of the device layer 510 may be performed by storage devices.

In accordance with the sequence diagram 500, the block layer 502 receives a write request 512 and associated data from an application layer (e.g., from an application or operating system). The block layer 502 sends an allocate queue request 514 to the protocol layer 504. The protocol layer then allocates a transfer buffer and generates an I/O command in the transfer buffer 516. The I/O command may include a protocol header, a command payload and a data payload. The data payload may include some or all of the associated data, depending on the size of the data. The protocol layer 504 then sends a request to the transport layer 505 to encapsulate the I/O command 518.

The transport layer 505 encapsulates the I/O command 520. This may include filling a transport layer header of an Ethernet packet containing the I/O command. If more data than will fit in a single Ethernet packet is to be written, the data may be encapsulated into multiple different Ethernet packets. The transport layer 505 at the host then sends 522 the Ethernet packet (or multiple Ethernet packets) to the transport layer 506 at the storage server 506.

The transport layer 506 validates 524 the received Ethernet packet (or packets). This may include determining whether the host is authorized to communicate with the storage server. If the Ethernet packet (or packets) is successfully validated, the transport layer 506 extracts the I/O command and/or data from the Ethernet packet (or packets) and sends 526 the I/O command and/or data to the protocol layer 508.

The protocol layer 508 allocates a buffer for the I/O command and generates one or more NVMe write commands based on the received I/O command (a write command) 528. The protocol layer 508 then sends the NVMe write commands 530 and/or data to the device layer 510 (e.g., to the storage devices to which the data is to be written). The device layer 510 provides a completion status 532 to the protocol layer 508 once the data is successfully written. The protocol layer 508 allocates a transfer buffer and generates an I/O response in the transfer buffer 534. The I/O response includes a protocol header, a command payload and/or a data payload that are sized to fit inside of an Ethernet packet. The protocol layer 508 then sends a request 535 to the transport layer 506. The transport layer 506 encapsulates the I/O response in an Ethernet packet 536. This includes adding a transport layer header to the Ethernet packet. The transport layer 506 then sends 538 the Ethernet packet to the host.

The transport layer 505 extracts the I/O response from the Ethernet packet and sends the data 540 to the protocol layer 504. The protocol layer 504 then performs a callback 542 to the block layer 502 indicating a write request completion. The block layer 502 then provides a write response 544 to the application layer.

FIGS. 6A-10 are flow diagrams of various implementations of methods related to providing access to remote NVMe drives for hosts. The methods are performed by processing logic that may include hardware (circuitry, dedicated logic, etc.), software (such as is run on a general purpose computer system or a dedicated machine), or a combination of both. Some methods may be performed by a remote NVMe driver such as remote NVMe driver 300 of FIG. 3. Some methods may be performed by a storage controller such as any storage controller 250 of FIG. 2B.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 6A:
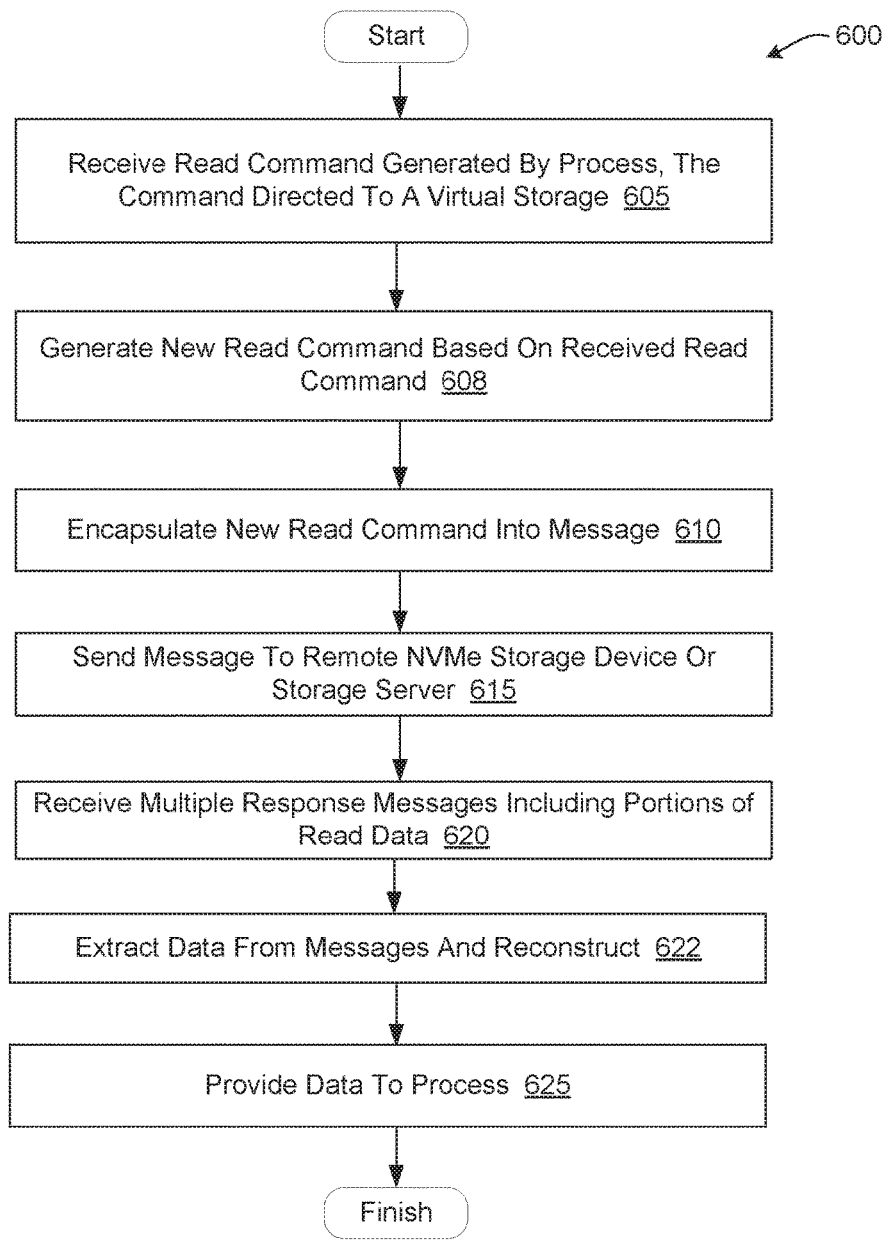
FIG. 6A is a flow diagram of one embodiment for a method of issuing read commands to a virtual NVMe drive.

FIG. 6A is a flow diagram of one embodiment for a method 600 of issuing read commands to a virtual NVMe drive. Method 600 may be performed, for example, by a remote NVMe driver on a host. At block 605 of method 600, processing logic receives a read command generated by a process such as an application thread or an operating system thread. The received command may be a command to read data from a virtual storage (e.g., from a virtual NVMe drive mounted on the host).

At block 608, processing logic terminates the received read command and generates a new read command based on the received read command. The new read command may comply with an NVMe over Ethernet protocol, and may include a protocol header, a command payload and/or a data payload. At block 610, processing logic encapsulates the new read command into a message (e.g., into an Ethernet packet).

At block 615, processing logic sends the new message to a storage server or to a remote NVMe storage device that is attached to a network. At block 620, processing logic receives multiple response messages, each of which may include portions of data requested in the read command. The data may be spread, for example, over multiple Ethernet packets to comply with size restrictions of Ethernet. At block 622, as the response messages are received, processing logic extracts the data portions from the response message and adds the data portions to a buffer to reconstruct the data. A final response message will include a status completion notification. The status completion notification signals processing logic that all requested data has been received. Responsive to receiving such a status completion notification, at block 625 processing logic provides the reconstructed data to the process.

Figure 6B:
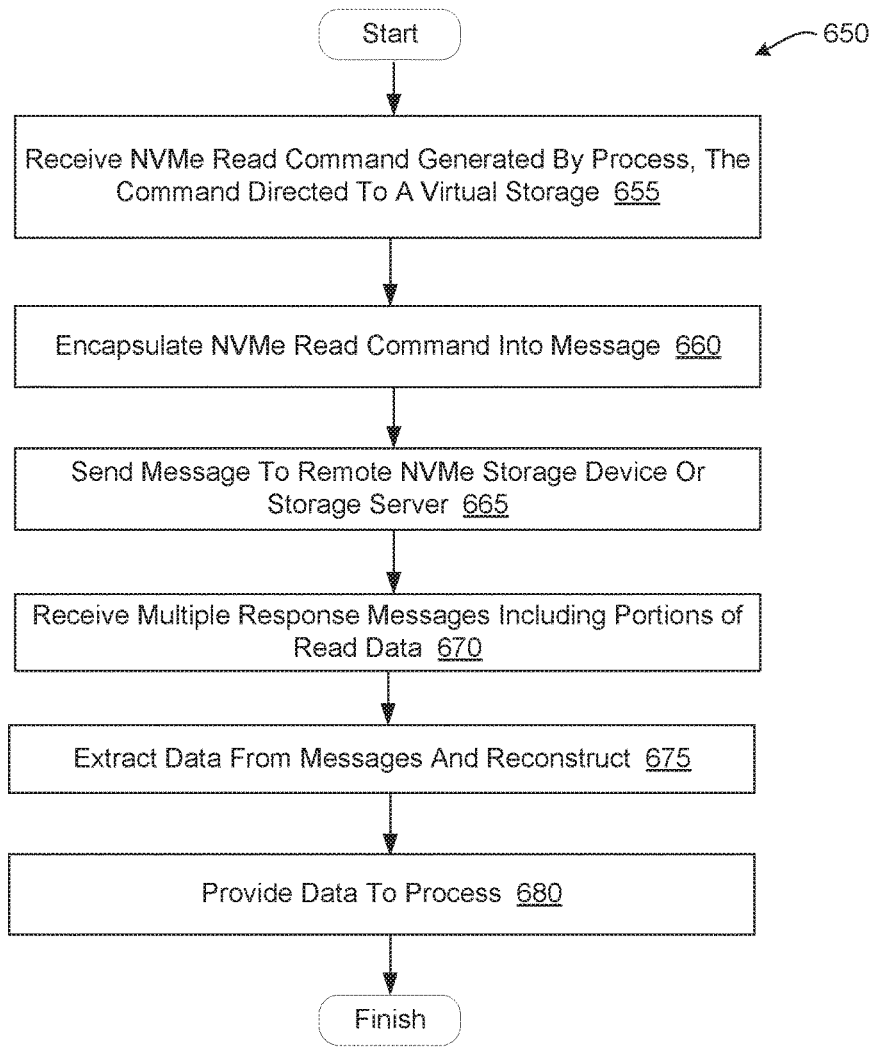
FIG. 6B is a flow diagram of another embodiment for a method of issuing read commands to a virtual NVMe drive.

FIG. 6B is a flow diagram of another embodiment for a method 650 of issuing read commands to a virtual NVMe drive. Method 650 may be performed, for example, by a remote NVMe driver on a host. At block 655 of method 650, processing logic receives a read command (e.g., an NVMe read command or other read command) generated by a process such as an application thread or an operating system thread. The received command may be a command to read data from a virtual storage (e.g., from a virtual NVMe drive mounted on the host).

At block 660, processing logic encapsulates the NVMe read command (or other read command) into a message such as an Ethernet packet. At block 665, processing logic sends the message to a storage server or to a remote NVMe storage device that is attached to a network. At block 670, processing logic receives multiple response messages, each of which may include portions of data requested in the read command. The data may be spread, for example, over multiple Ethernet packets to comply with size restrictions of Ethernet. At block 675, as the response messages are received, processing logic extracts the data portions from the response messages and adds the data portions to a buffer to reconstruct the data. A final response message will include a status completion notification. Responsive to receiving such a status completion notification, at block 680 processing logic provides the reconstructed data to the process.

Figure 7A:
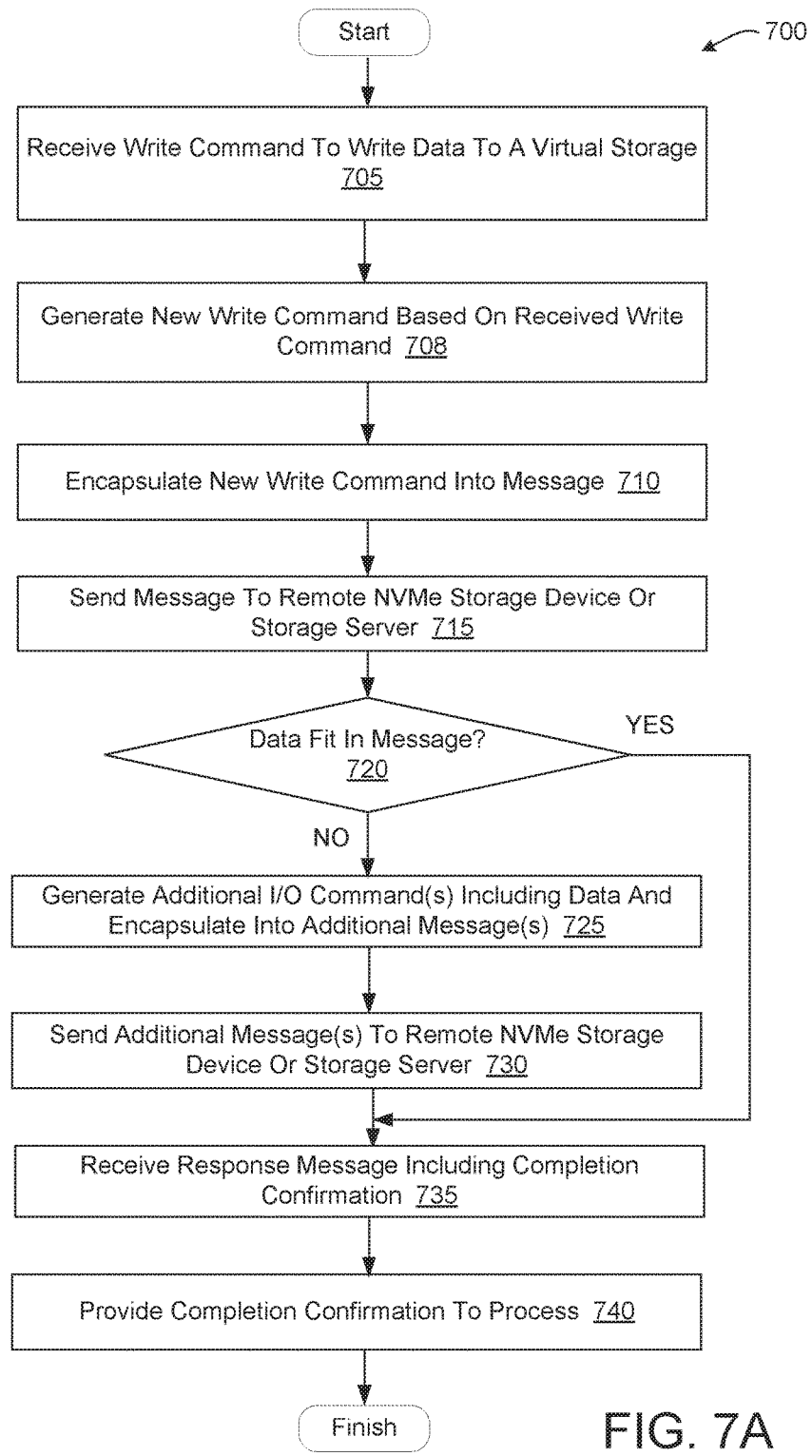
FIG. 7A is a flow diagram of one embodiment for a method of issuing write commands to a virtual NVMe drive.

FIG. 7A is a flow diagram of one embodiment for a method 700 of issuing write commands to a virtual NVMe drive. Method 700 may be performed, for example, by a remote NVMe driver on a host. At block 705 of method 700, processing logic receives a write command generated by a process such as an application thread or an operating system thread. The received command may be a command to write data to a virtual storage (e.g., to a virtual NVMe drive mounted on the host).

At block 708, processing logic terminates the received write command and generates a new write command based on the received write command. The new write command may comply with an NVMe over Ethernet protocol, and may include a protocol header, a command payload and/or a data payload. At block 710, processing logic encapsulates the new write command into a message (e.g., into an Ethernet packet).

At block 715, processing logic sends the new message to a storage server or to a remote NVMe storage device that is attached to a network. At block 720, processing logic determines whether the data to be written will fit into a single message (e.g., will fit into a single Ethernet packet). If the data will fit into a single message, the method proceeds to block 735. Otherwise the method continues to block 725.

At block 725, processing logic generates I/O commands and encapsulates the additional I/O commands into additional messages (e.g., additional Ethernet packets). Each of the additional I/O commands may comply with an NVMe over Ethernet protocol, and may include a protocol head identifying the I/O command as a data out command, a command payload and a data payload containing a portion of the data to be written. At block 730, processing logic sends the additional messages to the remote NVMe storage device or storage server.

At block 735, processing logic receives a response message including a completion confirmation. At block 740, processing logic extracts the completion confirmation from the response message and provides a completion confirmation to the process.

Figure 7B:
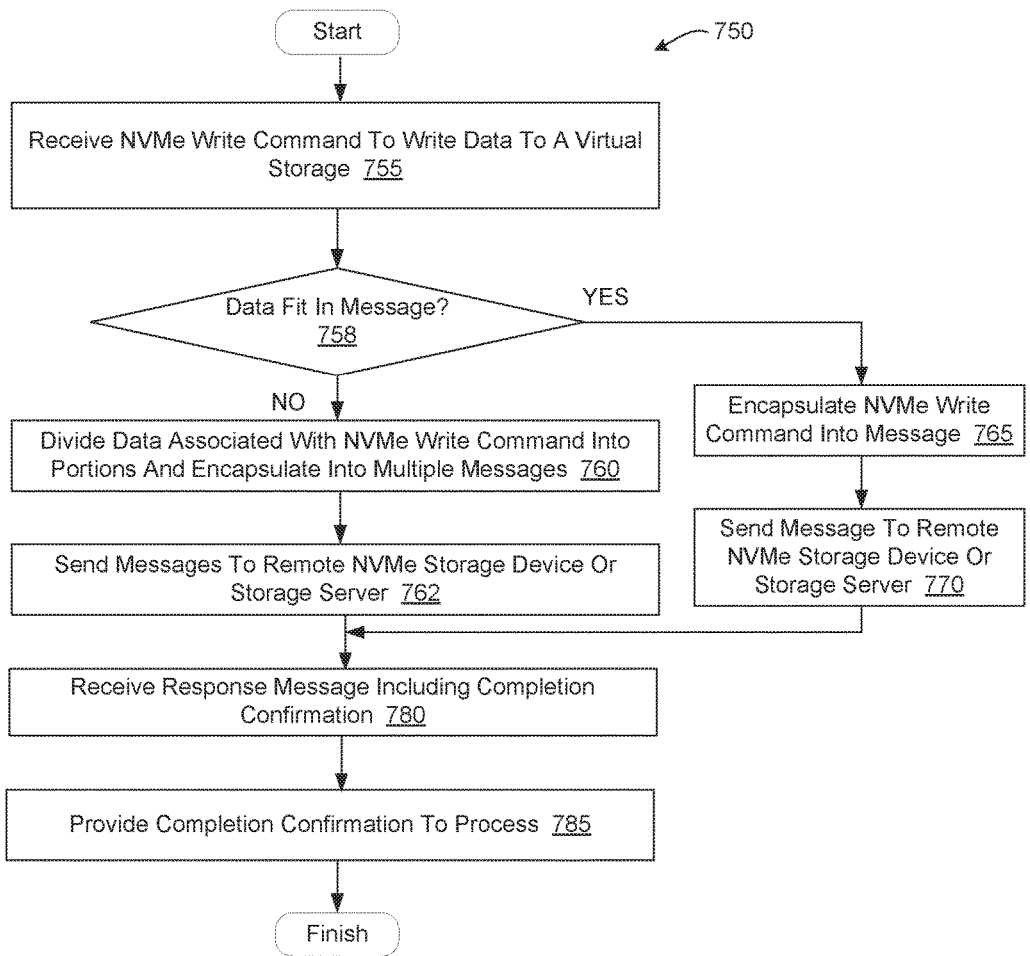
FIG. 7B is a flow diagram of another embodiment for a method of issuing write commands to a virtual NVMe drive.

FIG. 7B is a flow diagram of another embodiment for a method 750 of issuing write commands to a virtual NVMe drive. Method 750 may be performed, for example, by a remote NVMe driver on a host. At block 755 of method 750, processing logic receives a write command (e.g., an NVMe write command) generated by a process such as an application thread or an operating system thread. The received command may be a command to write data to a virtual storage (e.g., to a virtual NVMe drive mounted on the host).

At block 758, processing logic determines whether the received NVMe write command and its associated data will fit into a single message (e.g., into a single Ethernet packet). If so, the method continues to block 765. If the NVMe write command and its associated data will not fit into a single message, the method continues to block 760.

At block 765, processing logic encapsulates the received write command into a message (e.g., into an Ethernet packet). At block 770, processing logic sends the message to a storage server or to a remote NVMe storage device that is attached to a network.

At block 760, processing logic divides the NVMe write command and its associated data into multiple portions, with each portion having a size less than a size threshold. The size threshold may be, for example, a size threshold for Ethernet packets. Processing logic then encapsulates the NVMe write command and the data from the portions into multiple messages (e.g., multiple Ethernet packets). At block 762, processing logic sends the multiple messages to the storage server or to the remote NVMe storage device that is attached to the network.

At block 780, processing logic receives a response message including a completion confirmation. At block 785, processing logic extracts the completion confirmation from the response message and provides a completion confirmation to the process.

Figure 8:
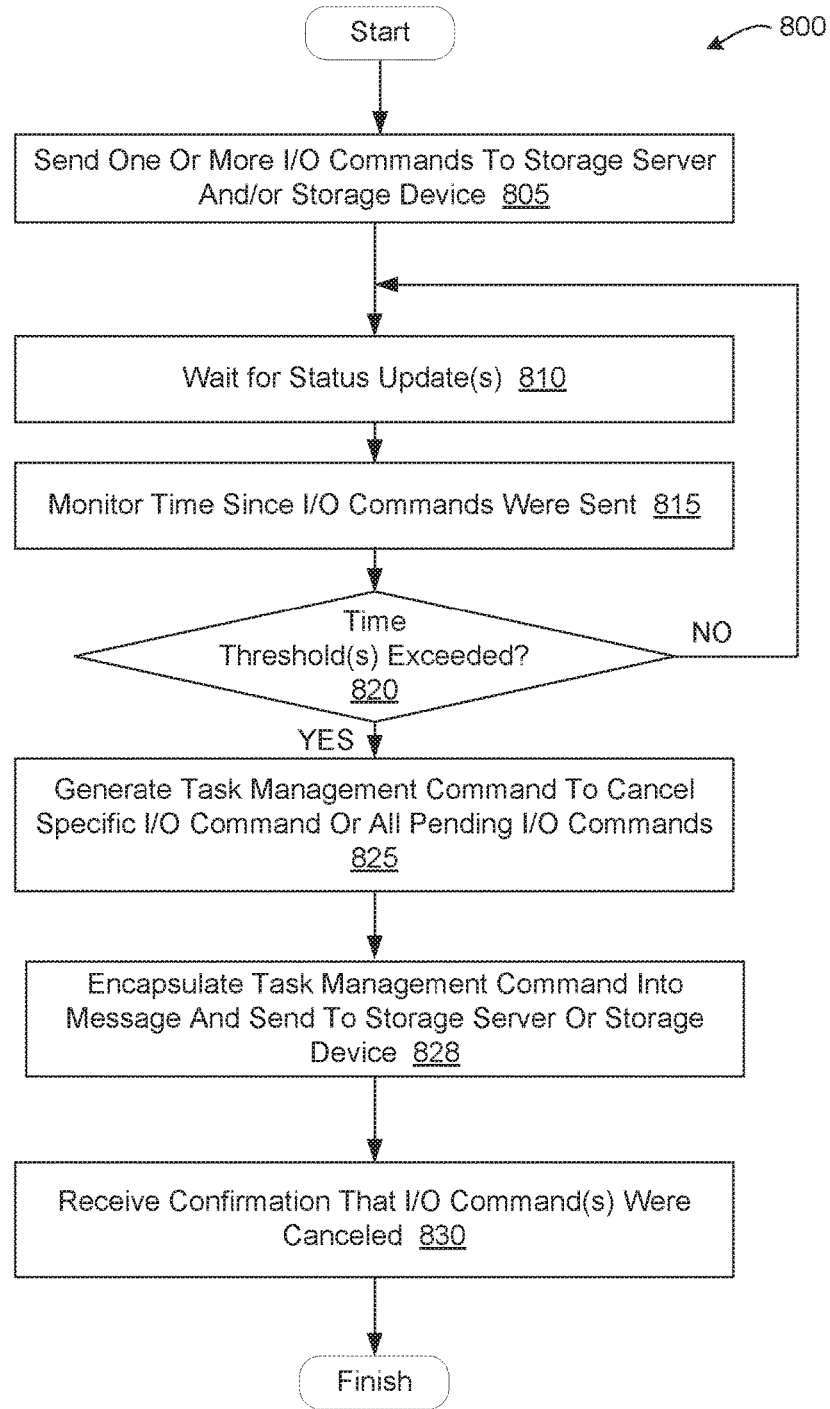
FIG. 8 is a flow diagram of one embodiment for a method of canceling input/output (I/O) commands sent to a virtual NVMe drive.

FIG. 8 is a flow diagram of one embodiment for a method of canceling input/output (I/O) commands sent to a virtual NVMe drive. At block 805, processing logic sends one or more I/O commands to a storage server and/or to a storage device. A time that each I/O command was sent may be recorded along with a unique identifier of that I/O command.

At block 810, processing logic waits for status updates regarding the sent I/O commands. At block 815, processing logic monitors a time since the I/O commands were sent. At block 820, processing logic identifies I/O commands for which responses have not been received. For such I/O commands, processing logic determines whether a time that has elapsed since any of the I/O commands were sent exceeds a time threshold. Different types of I/O commands may take different amounts of time to complete, and so may be associated with different time thresholds. Alternatively, all I/O commands may be associated with the same time threshold. Additionally, time thresholds may vary based on network conditions such as available bandwidth, latency, etc. and/or based on conditions and/or capabilities of the storage server and/or storage device to which the commands were sent. If a time threshold has been exceeded for any I/O command, the method continues to block 825. Otherwise, the method returns to block 810.

At block 825, processing logic generates a task management command to cancel a specific I/O command for which a time threshold has been exceeded. The task management command may identify the I/O command by a unique identifier assigned to that I/O command. Alternatively, processing logic may generate a task management command that identifies multiple I/O commands or that specifies all I/O commands. At block 828, processing logic encapsulates the task management command into a message such as an Ethernet packet. Processing logic then sends the message to the storage server or storage device. At block 830, processing logic receives confirmation that the one or more I/O commands have been canceled.

Figure 9:
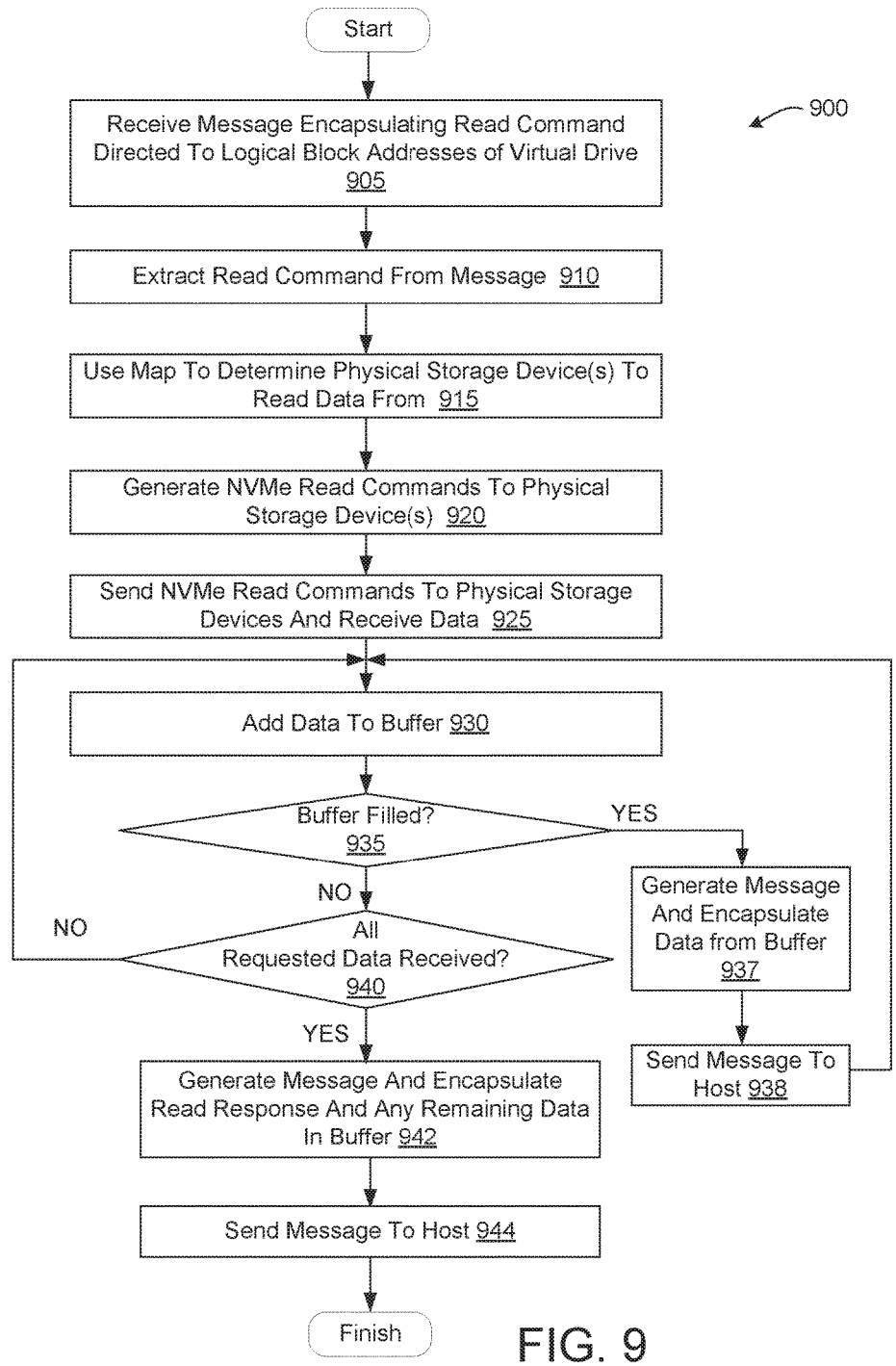
FIG. 9 is a flow diagram of one embodiment for a method of responding to read commands to a virtual NVMe drive.

FIG. 9 is a flow diagram of one embodiment for a method 900 of responding to read commands to a virtual NVMe drive. Method 900 may include providing a virtual NVMe drive or other virtual drive to a host and reading from physical NVMe drives (or other physical drives) that map to the virtual NVMe drive (or other virtual drive). Method 900 may be performed, for example, by a storage controller on a storage server or included in a storage device (e.g., in a physical NVMe drive). At block 905 of method 900, processing logic receives a message encapsulating a read command directed to logical block addresses of a virtual drive. In one embodiment, the received message is an Ethernet packet. The command encapsulated in the received message may be a command to read data from particular addresses of a virtual NVMe drive. In one embodiment, the received read command is an NVMe command that was generated at the host. Alternatively, the received read command may be a command in accordance with an NVMe over Ethernet protocol.

At block 910, processing logic extracts the read command from the message. At block 915, processing logic uses a map that maps the virtual drive to physical storage device to determine which storage devices to read data from. The map is also usable to determine specific addresses on the physical storage devices to read the data from.

In one embodiment, at block 920 processing logic generates NVMe read commands directed to the physical storage devices. A separate NVMe read command may be generated for each physical storage device from which data is to be read. Alternatively, if the message was received by processing logic of a network attached storage device, then processing logic may not generate an NVMe command. In such an embodiment, there may be a one-to-one correspondence between the virtual drive and the physical NVMe drive. Accordingly, the NVMe command that was generated at the host and directed to the virtual drive may be used for the physical NVMe drive.

At block 925, processing logic sends the NVMe read commands to the physical storage devices and receives data from these storage devices responsive to the read commands. This may include sending NVMe commands generated by processing logic to the storage devices or forwarding an NVMe command received form a host to a storage device.

At block 930, processing logic adds the received data to a buffer. The buffer may have a size that is approximately equivalent to the maximum allowed size of Ethernet packets. At block 935, processing logic determines whether the buffer has filled. If not, the method continues to block 940. If the buffer has filled at block 935, then the method continues to block 937.

At block 937, processing logic generates a message (e.g., an Ethernet packet) and encapsulates the data from the buffer into the message. Processing logic may generate an I/O response incorporating the data in the buffer, and may encapsulate the I/O response into the message. At block 938, processing logic then sends the message to the host. The method then returns to block 930.

At block 940, processing logic determines whether all requested data has been received from the storage devices. If not all requested data has been received, the method returns to block 930. If all requested data has been received, the method continues to block 942.

At block 942, processing logic generates a read response that includes a completion confirmation and any remaining data in the buffer. Processing logic encapsulates the read response into a message (e.g., an Ethernet packet). At block 944, processing logic sends the message to the host. This may signal to the host that all data requested in the read request has been sent.

Figure 10:
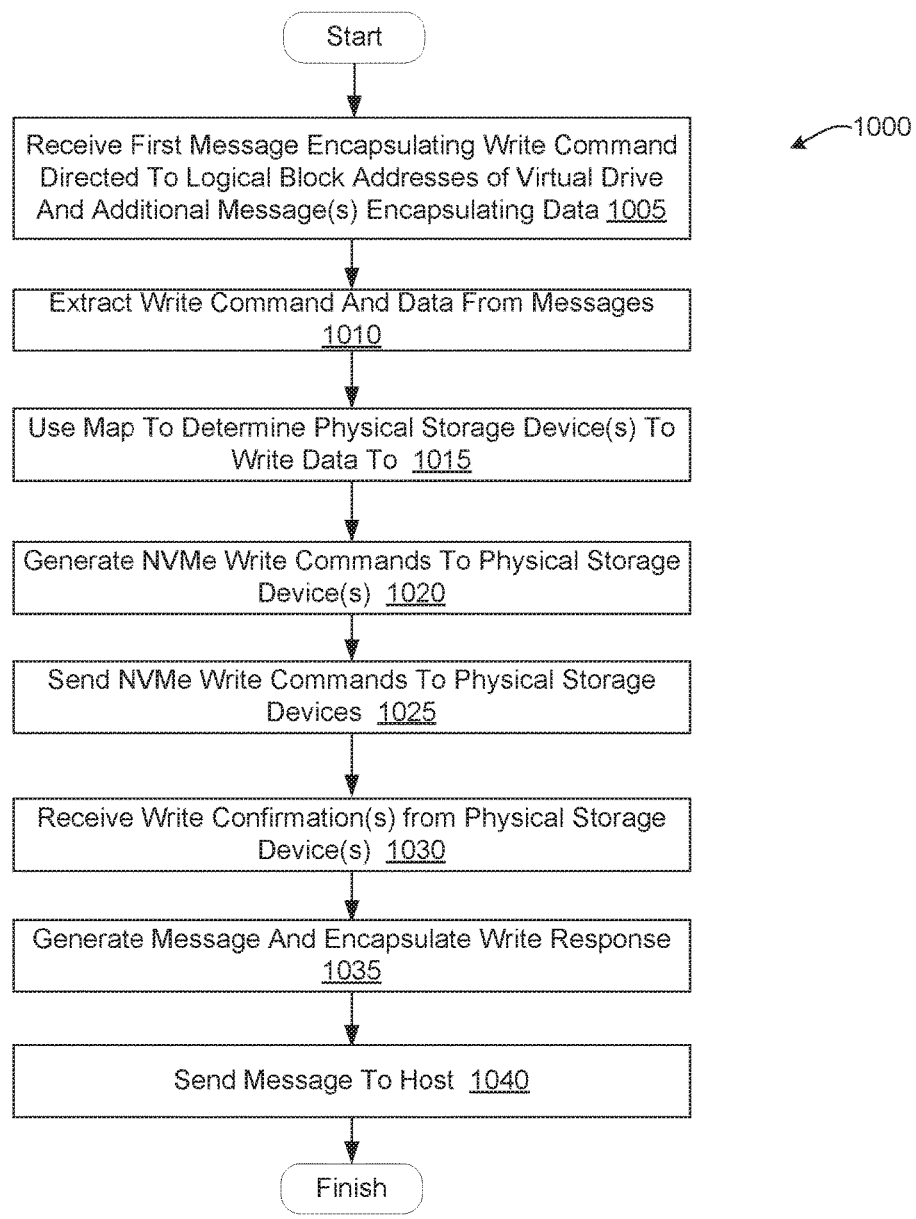
FIG. 10 is a flow diagram of one embodiment for a method of responding to write commands to a virtual NVMe drive.

FIG. 10 is a flow diagram of one embodiment for a method 1000 of responding to write commands to a virtual NVMe drive. Method 1000 may include providing a virtual NVMe drive or other virtual drive to a host and reading from physical NVMe drives (or other physical drives) that map to the virtual NVMe drive (or other virtual drive). Method 1000 may be performed, for example, by a storage controller on a storage server or included in a storage device (e.g., in a physical NVMe drive).

At block 1005 of method 1000, processing logic receives a first message encapsulating a write command directed to a virtual drive. In one embodiment, the received message is an Ethernet packet. The command encapsulated in the received message may be a command to write data to a virtual NVMe drive. In one embodiment, the received write command is an NVMe command that was generated at the host. Alternatively, the received write command may be a command in accordance with an NVMe over Ethernet protocol.

At block 1005, processing logic further receives additional messages (e.g., Ethernet packets) encapsulating data associated with the write command. Since Ethernet packets have a limited size, the data may be divided into portions, each of which may be encapsulated into a different Ethernet packet.

At block 1010, processing logic extracts the write command from the first message. The write command may specify the size of data that is to be written and/or the number of subsequent messages into which the data is encapsulated. Processing logic further extracts the data from the messages as the messages are received. The extracted data may be temporarily stored in a buffer.

At block 1015, processing logic uses a map that maps the virtual drive to physical storage devices to determine which storage devices to write the data to. Processing logic may determine empty (available) locations of the storage devices, and at block 1020 may generate NVMe write commands to write the data to the empty locations. Alternatively, logical locations to write to may be specified in the write command, and processing logic may physical locations that map to those specified logical locations. A separate NVMe write command may be generated for each physical storage device to which data is to be written. Alternatively, if processing logic is a component of a network attached NVMe drive, then processing logic may not generate an NVMe command. In such an embodiment, there may be a one-to-one correspondence between the virtual drive and the physical NVMe drive. Accordingly, the NVMe command that was generated at the host and directed to the virtual drive may be used for the physical NVMe drive.

At block 1025, processing logic sends the NVMe write commands to the physical storage devices. This may include sending NVMe commands generated by processing logic to the storage devices or forwarding an NVMe command received form a host to a storage device.

At block 1030, processing logic receives write confirmations from the storage devices responsive to the write commands. At block 1035, processing logic generates a write response and encapsulates the write response into a message (e.g., an Ethernet packet). At block 1040, processing logic then sends the message to the host.

Figure 11:
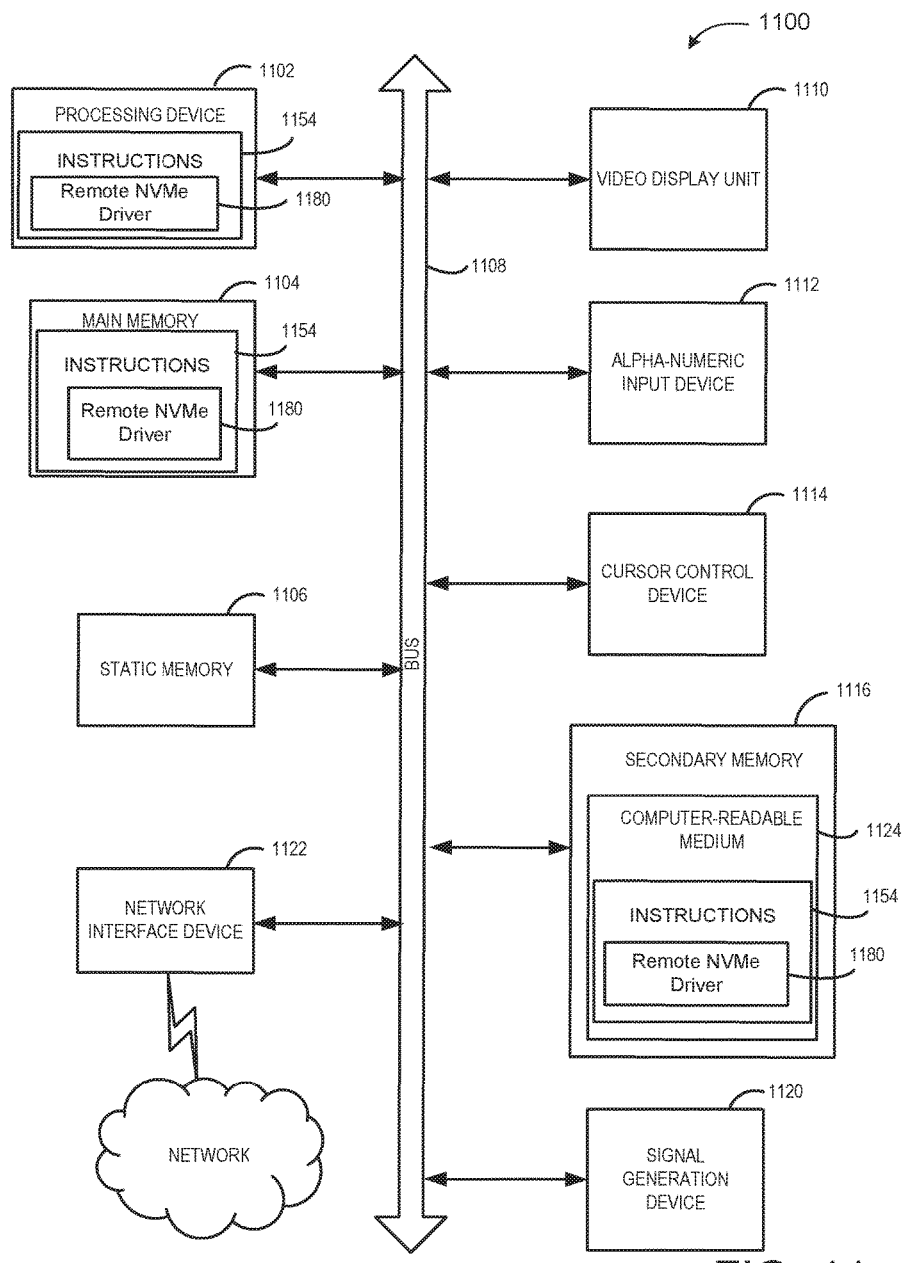
FIG. 11 illustrates an example computing device, in accordance with one embodiment.

FIG. 11 illustrates a diagrammatic representation of a machine in the example form of a computing device 1100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1116 (e.g., a data storage device), which communicate with each other via a bus 1108.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute processing logic (e.g., instructions 1154) for performing operations discussed herein.

The computing device 1100 may further include a network interface device 1122. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The secondary memory 1106 may include a machine-readable storage medium (or more specifically a computer-readable storage medium) 1124 on which is stored one or more sets of instructions 1154 embodying any one or more of the methodologies or functions described herein. The instructions 1154 may also reside, completely or at least partially, within the main memory 1104 and/or within the processing device 1102 during execution thereof by the computing device 1100, the main memory 1104 and the processing device 1102 also constituting computer-readable storage media.

The computer-readable storage medium 1124 may also be used to store a remote NVMe driver 1180 (as described with reference to FIG. 3), and/or a software library containing methods that call an NVMe driver 1180. While the computer-readable storage medium 1154 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 2A-3) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "determining", "receiving", "sending", "identifying" or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device, an input/output (I/O) command generated by a process, the I/O command directed to a virtual storage provided to a host executing the process, wherein the virtual storage comprises a virtual non-volatile memory express (NVMe) drive that is mapped to a first set of remote NVMe storage devices managed by a first storage controller and a second set of NVMe storage devices managed by a second storage controller;
generating a first new I/O command for the first storage controller based on the received I/O command;
generating a second new I/O command for the second storage controller based on the received I/O command;
encapsulating the first new I/O command into a first message;
encapsulating the second new I/O command into a second message;
sending, by the processing device, the first message to the first storage controller; and
sending, by the processing device, the second message to the second storage controller.

2. The method of claim 1, further comprising:
receiving a notification of a new virtual NVMe drive, the notification identifying an address associated with the new virtual NVMe drive;
sending a discovery request to the address associated with the new virtual NVMe drive; and
connecting to a third storage controller, wherein the third storage controller maps the new virtual NVMe drive to the first set of remote NVMe storage devices.

3. The method of claim 1, further comprising:
receiving a reply message from the first storage controller, the reply message encapsulating a response to the first new I/O command;
removing the response from the reply message; and
forwarding the response to the process.

4. The method of claim 1, wherein one or more NVMe storage devices in the first set of remote NVMe storage devices are also in the second set of NVMe storage devices.

5. The method of claim 1, wherein the first message comprises an Ethernet packet encapsulating the first new I/O command, wherein the first new I/O command is included in a payload portion of the Ethernet packet, and wherein the first new I/O command comprises a read command, the method further comprising:
receiving a plurality of additional Ethernet packets from the first storage controller;
extracting data from the plurality of additional Ethernet packets; and
providing the data to the process.

6. The method of claim 1, wherein the first message comprises an Ethernet packet encapsulating the first new I/O command, wherein the first new I/O command is included in a payload portion of the Ethernet packet, and wherein the first new I/O command comprises a write command to write data to the virtual NVMe drive, the method further comprising:
generating a plurality of additional Ethernet packets;
encapsulating portions of the data in the plurality of additional Ethernet packets; and
sending the plurality of additional Ethernet packets to the first storage controller.

7. The method of claim 1, wherein the first storage controller is a component of a storage server and the second storage controller is an additional component of the storage server.

8. The method of claim 1, wherein the first storage controller is a component of a first storage server and the second storage controller is a component of a second storage server.

9. A non-transitory computer readable storage medium comprising instructions that, when executed by a processing device of a host, cause the processing device to perform operations comprising:
receiving a write command generated by a process, wherein the write command is a command to write data to a virtual storage provided to a host executing the process, and wherein the virtual storage comprises a virtual non-volatile memory express (NVMe) drive that is mapped to a plurality of remote storage devices;
generating, by the processing device, a plurality of new commands based on the received write command, the plurality of new commands comprising:
a new write command specifying a size of the data; and
one or more additional commands, each of the one or more additional commands containing a portion of the data;
encapsulating the new write command into a first message;
for each additional command of the one or more additional commands, encapsulating the additional command into a corresponding additional message of one or more additional messages;
sending, by the processing device, the first message to a storage server comprising the plurality of remote storage devices; and
subsequently sending the one or more additional messages to the storage server.

10. The non-transitory computer readable storage medium of claim 9, wherein the first message comprises an Ethernet packet encapsulating the NVMe command, and wherein the NVMe command is included in a payload portion of the Ethernet packet.

11. The non-transitory computer readable storage medium of claim 10, wherein the write command is a command to write data to the virtual NVMe drive, the operations further comprising:
generating a plurality of additional Ethernet packets;
encapsulating portions of the data in the plurality of additional Ethernet packets; and
sending the plurality of additional Ethernet packets to the storage server.

12. The non-transitory computer readable storage medium of claim 9, the operations further comprising:
receiving a notification of a new virtual NVMe drive, the notification identifying an address associated with the new virtual NVMe drive;
sending a discovery request to the address associated with the new virtual NVMe drive; and
connecting to a storage controller of the storage server, wherein the storage controller maps the new virtual NVMe drive to the plurality of remote storage devices.

13. The non-transitory computer readable storage medium of claim 9, the operations further comprising:
receiving a reply message from the storage server, the reply message encapsulating a response to the new write command;
removing the response from the reply message; and
forwarding the response to the process.

14. The non-transitory computer readable storage medium of claim 9, the operations further comprising:
determining that no response to the new write command has been received;
determining whether a threshold amount of time has elapsed since the first message encapsulating the new write command was sent; and
responsive to determining that the threshold amount of time has elapsed, performing the following comprising:
generating a task management command to cancel the new write command;
encapsulating the task management command in a new message; and
sending the new message to the storage server.

15. A computing device comprising:
a memory to store instructions for a remote non-volatile memory express (NVMe) driver; and
a processing device, coupled to the memory, to execute the instructions, wherein the instructions cause the processing device to:
receive a write command generated by a process, wherein the write command is a command to write data to a virtual storage provided to a host executing the process, and wherein the virtual storage comprises a virtual non-volatile memory express (NVMe) drive that is mapped to a plurality of remote storage devices;

generate a plurality of new commands based on the received write command, the plurality of new commands comprising:
    a new write command specifying a size of the data; and
    one or more additional commands, each of the one or more additional commands containing a portion of the data;

encapsulate the new write command into a first message;

for each additional command of the one or more additional commands, encapsulate the additional command into a corresponding additional message of one or more additional messages;

send the first message to a storage server comprising the plurality of remote storage devices; and subsequently send the one or more additional messages to the storage server.

16. The computing device of claim 15, wherein the write command is a command to write data to the virtual NVMe drive, and wherein the processing device is further to:
    generate a plurality of additional Ethernet packets;
    encapsulate portions of the data in the plurality of additional Ethernet packets; and
    send the plurality of additional Ethernet packets to the storage server.

17. The computing device of claim 15, wherein the virtual NVMe drive maps to a first set of remote NVMe storage devices managed by a first storage server and a second set of remote NVMe storage devices managed by a second storage server, and wherein the processing device is further to:
    generate a first new write command for the first storage server and a second new write command for the second storage server based on the received write command;
    encapsulate the first new write command into the first message and the second new write command into a second message; and
    send the first message to the first storage server and the second message to the second storage server.

18. The computing device of claim 15, wherein the processing device is further to:
    determine that no response to the new write command has been received;
    determine whether a threshold amount of time has elapsed since the first message encapsulating the new write command was sent; and
    responsive to determining that the threshold amount of time has elapsed, perform the following comprising:
        generate a task management command to cancel the new write command;
        encapsulate the task management command in a new Ethernet packet; and
        send the new Ethernet packet to the storage server.

\* \* \* \* \*